(12) United States Patent
Hyde et al.

(10) Patent No.: US 9,631,610 B2
(45) Date of Patent: Apr. 25, 2017

(54) SYSTEM FOR POWERING DEVICES FROM INTRALUMINAL PRESSURE CHANGES

(75) Inventors: Roderick A. Hyde, Redmond, WA (US); Muriel Y. Ishikawa, Livermore, CA (US); Eric C. Leuthardt, St. Louis, MO (US); Michael A. Smith, Phoenix, AZ (US); Victoria Y. H. Wood, Livermore, CA (US); Lowell L. Wood, Jr., Bellevue, WA (US)

(73) Assignee: DEEP SCIENCE, LLC, Bellevue, WA (US)

(*) Notice: Subject to any disclaimer, the term of this patent is extended or adjusted under 35 U.S.C. 154(b) by 872 days.

(21) Appl. No.: 12/462,796

(22) Filed: Aug. 7, 2009

(65) Prior Publication Data

US 2010/0141052 A1 Jun. 10, 2010

Related U.S. Application Data

(63) Continuation-in-part of application No. 12/315,631, filed on Dec. 4, 2008, which is a continuation-in-part
(Continued)

(51) Int. Cl.
| | |
|---|---|
| F02B 63/04 | (2006.01) |
| F03G 7/08 | (2006.01) |
| H02K 7/18 | (2006.01) |
| F03G 7/04 | (2006.01) |
| B60L 11/02 | (2006.01) |
| B61C 9/38 | (2006.01) |

(52) U.S. Cl.
CPC ...................... *F03G 7/04* (2013.01)

(58) Field of Classification Search
USPC .................. 290/1 R, 10; 607/35; 600/16
See application file for complete search history.

(56) References Cited

U.S. PATENT DOCUMENTS 3,358,690 A * 12/1967 Cohen ............................. 607/23
3,421,512 A    1/1969 Frasier ............................ 607/35
(Continued)

FOREIGN PATENT DOCUMENTS

| EP | 1764034 | 3/2007 |
| GB | 1220677 | 1/1971 |
| GB | 2350302 | 11/2000 |

OTHER PUBLICATIONS

Lucklum, et al., Acoustic Wave Generation and Detection in Non-Piezoelectric High-Q Resonators, Ultrasonic Symposium 2006, Oct. 2006, pp. 1132-1135.
(Continued)

*Primary Examiner* — Pedro J Cuevas
(74) *Attorney, Agent, or Firm* — Faisal K. Abou-Nasr; Advent, LLP

(57) ABSTRACT

A system for utilizing power extracted from intraluminal pressure changes may comprise: (a) an intraluminal generator; (b) an intraluminal pressure change-receiving structure operably coupled to the intraluminal generator; and (c) a power utilization device. A system for utilizing power extracted from intraluminal pressure changes may comprise: (a) means for receiving an intraluminal pressure change; (b) means for converting an intraluminal pressure change into energy with an intraluminal generator; and (c) means for providing, the energy to a power utilization device.

27 Claims, 25 Drawing Sheets

Related U.S. Application Data of application No. 12/315,616, filed on Dec. 4, 2008, which is a continuation-in-part of application No. 12/386,054, filed on Apr. 13, 2009, now abandoned, which is a continuation-in-part of application No. 12/455,669, filed on Jun. 4, 2009, now Pat. No. 9,353,733, which is a continuation-in-part of application No. 12/462,789, filed on Aug. 7, 2009.

(56) References Cited

U.S. PATENT DOCUMENTS

| | | | |
|---|---|---|---|
| 3,456,134 A | 7/1969 | Ko | 607/35 |
| 3,522,811 A * | 8/1970 | Wingrove et al. | 607/27 |
| 3,563,245 A * | 2/1971 | McLean et al. | 607/35 |
| 3,649,615 A | 3/1972 | Ikeda et al. | 534/642 |
| 3,659,615 A | 5/1972 | Enger | 607/35 |
| 3,861,397 A * | 1/1975 | Rao et al. | 607/35 |
| 3,906,960 A * | 9/1975 | Lehr | 607/35 |
| 3,943,936 A | 3/1976 | Rasor et al. | 607/35 |
| 4,140,132 A | 2/1979 | Dahl | 607/19 |
| 4,294,891 A * | 10/1981 | Yao et al. | 429/2 |
| 4,453,537 A * | 6/1984 | Spitzer | 623/3.12 |
| 4,538,616 A | 9/1985 | Rogoff | 600/365 |
| 4,661,107 A * | 4/1987 | Fink | 623/2.34 |
| 4,690,143 A | 9/1987 | Schroeppel | 607/5 |
| 4,798,206 A | 1/1989 | Maddison et al. | 607/122 |
| 5,007,927 A * | 4/1991 | Badylak et al. | 623/3.12 |
| 5,010,893 A | 4/1991 | Sholder | 600/595 |
| 5,022,395 A | 6/1991 | Russie | 607/16 |
| 5,062,841 A | 11/1991 | Siegel | 604/891.1 |
| 5,154,680 A | 10/1992 | Drzewiecki et al. | 600/485 |
| 5,188,738 A | 2/1993 | Kaali et al. | 424/529 |
| 5,205,286 A | 4/1993 | Soukup et al. | 600/377 |
| 5,344,385 A * | 9/1994 | Buck et al. | 600/16 |
| 5,348,019 A | 9/1994 | Sluss, Jr. et al. | 600/480 |
| 5,363,855 A | 11/1994 | Drzewiecki et al. | 600/485 |
| 5,366,454 A | 11/1994 | Currie et al. | 604/890.1 |
| 5,411,537 A * | 5/1995 | Munshi et al. | 607/33 |
| 5,431,694 A | 7/1995 | Snaper et al. | 607/35 |
| 5,443,504 A * | 8/1995 | Hill | 623/3.12 |
| 5,457,624 A * | 10/1995 | Hastings | 363/127 |
| 5,522,394 A | 6/1996 | Zurbrugg | 600/459 |
| 5,535,752 A | 7/1996 | Halperin et al. | 600/483 |
| 5,617,876 A | 4/1997 | van Duyl | 600/595 |
| 5,626,141 A | 5/1997 | Takeda | 600/490 |
| 5,653,676 A * | 8/1997 | Buck et al. | 600/16 |
| 5,690,693 A * | 11/1997 | Wang et al. | 607/61 |
| 5,693,952 A | 12/1997 | Cox | 250/551 |
| 5,701,919 A * | 12/1997 | Buck et al. | 128/898 |
| 5,702,431 A * | 12/1997 | Wang et al. | 607/61 |
| 5,713,939 A * | 2/1998 | Nedungadi et al. | 607/33 |
| 5,715,837 A | 2/1998 | Chen | 128/899 |
| 5,734,564 A * | 3/1998 | Brkovic | 363/21.16 |
| 5,745,358 A * | 4/1998 | Faulk | 363/95 |
| 5,749,909 A * | 5/1998 | Schroeppel et al. | 607/33 |
| 5,764,495 A * | 6/1998 | Faulk | 363/21.13 |
| 5,810,015 A | 9/1998 | Flaherty | 128/897 |
| 5,823,199 A | 10/1998 | Hastings et al. | 128/899 |
| 5,954,058 A | 9/1999 | Flaherty | 128/899 |
| 5,967,986 A | 10/1999 | Cimochowski et al. | 600/454 |
| 5,984,857 A * | 11/1999 | Buck et al. | 600/16 |
| 6,164,284 A | 12/2000 | Schulman et al. | 128/899 |
| 6,268,161 B1 | 7/2001 | Han et al. | 435/14 |
| 6,291,900 B1 * | 9/2001 | Tiemann et al. | 290/1 A |
| 6,409,674 B1 | 6/2002 | Brockway et al. | 600/486 |
| 6,426,628 B1 | 7/2002 | Palm et al. | 324/427 |
| 6,432,050 B1 | 8/2002 | Porat et al. | 600/300 |
| 6,475,750 B1 | 11/2002 | Han et al. | 435/14 |
| 6,524,256 B2 | 2/2003 | Schaldach et al. | 600/486 |
| 6,564,807 B1 | 5/2003 | Schulman et al. | 128/899 |
| 6,580,177 B1 | 6/2003 | Hagood, IV et al. | 290/1 R |
| 6,589,184 B2 | 7/2003 | Norén et al. | 600/486 |
| 6,635,048 B1 | 10/2003 | Ullestad et al. | 604/890.1 |
| 6,638,231 B2 | 10/2003 | Govari et al. | 600/486 |
| 6,682,490 B2 | 1/2004 | Roy et al. | 600/486 |
| 6,711,423 B2 | 3/2004 | Colvin, Jr. | 600/317 |
| 6,802,811 B1 | 10/2004 | Slepian | 600/309 |
| 6,822,343 B2 | 11/2004 | Estevez | 290/18 |
| 6,827,682 B2 | 12/2004 | Bugge et al. | 600/16 |
| 6,829,507 B1 | 12/2004 | Lidman et al. | 607/16 |
| 6,860,857 B2 | 3/2005 | Norén et al. | 600/486 |
| 6,895,265 B2 | 5/2005 | Silver | 600/345 |
| 6,937,894 B1 | 8/2005 | Isaac et al. | 607/5 |
| 6,953,469 B2 | 10/2005 | Ryan | 606/192 |
| 7,032,600 B2 | 4/2006 | Fukuda et al. | 128/899 |
| 7,033,322 B2 | 4/2006 | Silver | 600/486 |
| 7,081,683 B2 * | 7/2006 | Ariav | 290/1 R |
| 7,081,699 B2 | 7/2006 | Keolian et al. | 310/311 |
| 7,167,756 B1 | 1/2007 | Torgerson et al. | 607/61 |
| 7,223,237 B2 | 5/2007 | Shelchuk | 600/309 |
| 7,241,266 B2 | 7/2007 | Zhou et al. | 600/365 |
| 7,263,894 B2 | 9/2007 | Tenerz | 73/756 |
| 7,302,856 B2 | 12/2007 | Tang et al. | 73/777 |
| 7,362,557 B2 * | 4/2008 | Soudier et al. | 361/93.8 |
| 7,367,968 B2 | 5/2008 | Rosenberg et al. | 604/891.1 |
| 7,403,821 B2 | 7/2008 | Haugland et al. | 607/49 |
| 7,413,547 B1 | 8/2008 | Lichtscheidl et al. | 600/486 |
| 7,424,325 B2 | 9/2008 | Koller et al. | 607/35 |
| 7,425,200 B2 | 9/2008 | Brockway et al. | 600/486 |
| 7,427,265 B1 | 9/2008 | Keilman et al. | 600/300 |
| 7,452,334 B2 | 11/2008 | Gianchandani et al. | 600/485 |
| 7,465,313 B2 | 12/2008 | DiMauro et al. | 607/92 |
| 7,489,966 B2 | 2/2009 | Leinders et al. | 607/2 |
| 7,616,990 B2 | 11/2009 | Chavan et al. | 607/2 |
| 7,616,992 B2 | 11/2009 | Dennis et al. | 607/9 |
| 7,715,918 B2 * | 5/2010 | Melvin | 607/35 |
| 7,729,767 B2 | 6/2010 | Baker, III et al. | 607/35 |
| 7,729,768 B2 | 6/2010 | White et al. | 607/35 |
| 7,777,623 B2 | 8/2010 | Albsmeier et al. | 340/539.26 |
| 7,798,973 B2 | 9/2010 | Stahmann | 600/485 |
| 7,859,171 B2 * | 12/2010 | Micallef | 310/339 |
| 2002/0028999 A1 | 3/2002 | Schaldach et al. | 600/486 |
| 2003/0158584 A1 | 8/2003 | Cates et al. | 607/2 |
| 2004/0021322 A1 * | 2/2004 | Ariav | 290/1 R |
| 2004/0039242 A1 * | 2/2004 | Tolkoff et al. | 600/9 |
| 2004/0078027 A1 | 4/2004 | Shachar | 604/891.1 |
| 2004/0158294 A1 * | 8/2004 | Thompson | 607/17 |
| 2004/0173220 A1 | 9/2004 | Harry et al. | 8/892 |
| 2004/0193058 A1 | 9/2004 | Montegrande et al. | 600/488 |
| 2004/0204744 A1 | 10/2004 | Penner et al. | 607/23 |
| 2004/0215279 A1 | 10/2004 | Houben et al. | 607/35 |
| 2005/0055061 A1 * | 3/2005 | Holzer | 607/35 |
| 2005/0080346 A1 | 4/2005 | Gianchandani et al. | 600/486 |
| 2005/0256549 A1 | 11/2005 | Holzer | 607/35 |
| 2005/0261563 A1 | 11/2005 | Zhou et al. | 600/347 |
| 2006/0044078 A1 | 3/2006 | Ayazi et al. | 333/186 |
| 2006/0152309 A1 | 7/2006 | Mintchev et al. | 335/58 |
| 2006/0184206 A1 * | 8/2006 | Baker et al. | 607/35 |
| 2006/0217776 A1 * | 9/2006 | White et al. | 607/35 |
| 2006/0224214 A1 * | 10/2006 | Koller et al. | 607/62 |
| 2006/0247724 A1 | 11/2006 | Gerber et al. | 607/41 |
| 2006/0287598 A1 | 12/2006 | Lasater et al. | 600/439 |
| 2007/0074731 A1 * | 4/2007 | Potter | 128/899 |
| 2007/0088402 A1 * | 4/2007 | Melvin | 607/35 |
| 2007/0093875 A1 | 4/2007 | Chavan et al. | 607/46 |
| 2007/0142728 A1 | 6/2007 | Penner et al. | 600/486 |
| 2007/0149885 A1 | 6/2007 | Corl et al. | 600/505 |
| 2007/0167988 A1 | 7/2007 | Cernasov | 607/35 |
| 2007/0221233 A1 | 9/2007 | Kawano et al. | 128/899 |
| 2007/0293904 A1 * | 12/2007 | Gelbart et al. | 607/35 |
| 2008/0009687 A1 | 1/2008 | Smith et al. | 600/302 |
| 2008/0021333 A1 | 1/2008 | Huelskamp | 600/486 |
| 2008/0082005 A1 | 4/2008 | Stern et al. | 600/486 |
| 2008/0132967 A1 | 6/2008 | Von Arx et al. | 607/18 |
| 2008/0172043 A1 | 7/2008 | Sheppard et al. | 604/891.1 |
| 2008/0212262 A1 * | 9/2008 | Micallef | 361/502 |
| 2008/0262562 A1 * | 10/2008 | Roberts et al. | 607/35 |
| 2008/0281298 A1 | 11/2008 | Andersen et al. | 604/891.1 |
| 2009/0171413 A1 | 7/2009 | Zenati et al. | 607/32 |
| 2009/0171448 A1 | 7/2009 | Eli | 623/1.32 |
| 2009/0270742 A1 | 10/2009 | Wolinsky et al. | 600/486 |
| 2009/0281399 A1 | 11/2009 | Keel et al. | 600/301 |
| 2009/0292335 A1 * | 11/2009 | Leonov | 607/35 |
| 2010/0010600 A1 | 1/2010 | Eriksson et al. | 607/116 |

(56) References Cited

U.S. PATENT DOCUMENTS

| | | | |
|---|---|---|---|
| 2010/0030043 A1 | 2/2010 | Kuhn | 600/339 |
| 2010/0036450 A1 | 2/2010 | Axelrod et al. | 607/35 |
| 2010/0049275 A1 | 2/2010 | Chavan et al. | 607/44 |
| 2010/0076517 A1* | 3/2010 | Imran | 607/35 |
| 2010/0140943 A1 | 6/2010 | Hyde et al. | 290/50 |
| 2010/0140956 A1 | 6/2010 | Hyde et al. | 290/1 R |
| 2010/0140957 A1 | 6/2010 | Hyde et al. | 290/1 R |
| 2010/0140958 A1 | 6/2010 | Hyde et al. | 290/1 R |
| 2010/0140959 A1 | 6/2010 | Hyde et al. | 290/1 R |
| 2010/0141052 A1 | 6/2010 | Hyde et al. | 307/151 |
| 2010/0228312 A1* | 9/2010 | White et al. | 607/35 |
| 2010/0298720 A1* | 11/2010 | Potkay | 600/485 |
| 2011/0062713 A1 | 3/2011 | Ardoise et al. | 90/53 |
| 2011/0094314 A1 | 4/2011 | Dekker et al. | 73/862.045 |
| 2011/0275947 A1 | 11/2011 | Feldman et al. | 600/508 |

OTHER PUBLICATIONS

Franklin Hadley, Goodbye Wires . . . MIT team experimentally demonstrates wireless power transfer, potentially useful for powering laptops, cell phones without cords; MIT News, Jun. 7, 2007, Publisher: http://web.mit.edu/newsoffice/2007/wireless-0607.html, Published in: US.

Chaimanonart, et al., Implantable RF Power Converter for Small Animal in Vivo Biological Monitoring, Sep. 1-4, 2005, Publisher: Proceedings of the 2005 IEEE Engineering in Medicine and Biology 27th Annual Conference.

Zhong Lin Wang, Self-Powered Nanotech: Nanosize Machines Need Still Tinier Power Plants, Scientific American Magazine, Dec. 16, 2007, pp. 82-87, Published in: US.

Dmitriev, et al., Tunable High-Q Surface-Acoustic-Wave Resonator, http://www.ingentaconnect.com/content/maik/10637842/2007/00000052/..., Aug. 2007, pp. 1061-1067, vol. 52, No. 8, Publisher: Maik Nauka/Interperiodica.

Kara Gavin, Zapping the Heart Back Into Rhythm, University of Michigan Health Minute, Jun. 2, 2005, Published in: Ann Arbor, MI.

Dmitriev, V.F., et al., "Tunable High-Q Surface-Acoustic-Wave Resonator"; Technical Physics, vol. 52, No. 8, Aug. 2007, pp. 1061-1067.

Lucklum, Frieder, et al., "Acoustic Wave Generation and Detection in Non-Piezoelectric High-Q Resonators", Ultrasonics Symposium, 2006, Oct. 2006, pp. 1132-1135.

* cited by examiner 1002 providing energy to an at least partially intraluminal power utilization device 1004 providing energy to an at least partially extraluminal power utilization device 1006 providing energy from an intraluminal generator disposed in a first lumen to an intraluminal power utilization device disposed in a second lumen 1102 providing energy from an intraluminal generator to an intraluminal power utilization device in a distal configuration with respect to the intraluminal generator 1104 providing energy to an ex vivo power utilization device 1202 providing energy to an insulin pump 1204 providing energy to a neural stimulation electrode 1206 providing energy to a pharmaceutical dispenser 1302 providing energy to a chemical sensor 1304 providing energy to a pH sensor 1306 providing energy to a blood sugar monitor 1402 providing energy to an electromagnetic sensor 1404 providing energy to an optical source 1406 providing energy to an optical sensor

FIG. 21 (cont.)

SYSTEM FOR POWERING DEVICES FROM INTRALUMINAL PRESSURE CHANGES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of the United States Patent Application having U.S. patent application Ser. No. 12/315,631, titled "Method for Generation of Power from Intraluminal Pressure Changes," naming Roderick A. Hyde, Muriel Y. Ishikawa, Eric C. Leuthardt, Michael A. Smith, Lowell L. Wood, Jr. and Victoria Y. H. Wood as inventors, filed Dec. 4, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/315,616, titled "Method for Generation of Power from Intraluminal Pressure Changes", naming Roderick A. Hyde, Muriel Y. Ishikawa, Eric C. Leuthardt, Michael A. Smith, Lowell L. Wood, Jr. and Victoria Y. H. Wood as inventors, filed Dec. 4, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/386,054, titled "Method for Generation of Power from Intraluminal Pressure Changes", naming Roderick A. Hyde, Muriel Y. Ishikawa, Eric C. Leuthardt, Michael A. Smith, Lowell L. Wood, Jr. and Victoria Y. H. Wood as inventors, filed Apr. 13, 2009 now abandoned, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/455,669, titled "Device and System for Generation of Power from Intraluminal Pressure Changes", naming Roderick A. Hyde, Muriel Y. Ishikawa, Eric C. Leuthardt, Michael A. Smith, Lowell L. Wood, Jr. and Victoria Y. H. Wood as inventors, filed Jun. 4, 2009 now U.S. Pat. No. 9,353,733, which is currently co-pending, or is an application of which a currently co-pending application is entitled to the benefit of the filing date.

For purposes of the USPTO extra-statutory requirements, the present application constitutes a continuation-in-part of the Patent Application associated with U.S. patent application Ser. No. 12/462,789, titled "Device for Storage of Intraluminally Generated Power", naming Roderick A. Hyde, Muriel Y. Ishikawa, Eric C. Leuthardt, Michael A. Smith, Lowell L. Wood, Jr. and Victoria Y. H. Wood as inventors, filed Aug. 7, 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

Small scale generators for generating energy at levels suitable for powering devices which are in vivo or ex vivo to a human or animal are described. Such generators may be implanted in luminal structures so as to extract power from intraluminal pressure changes.

DETAILED DESCRIPTION

Figure 1:
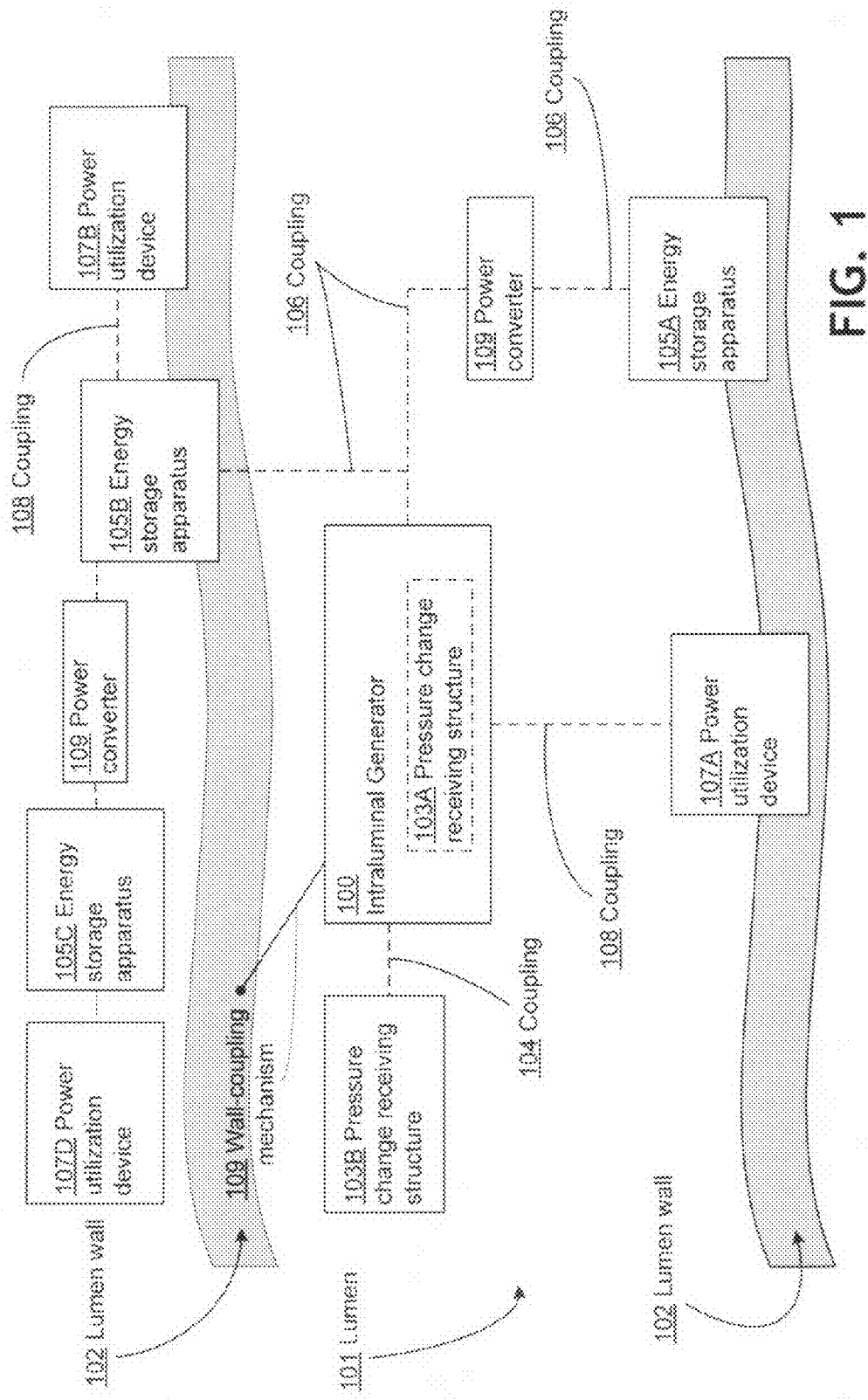
FIG. 1 shows a high-level block diagram of an intraluminal power generation system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 2:
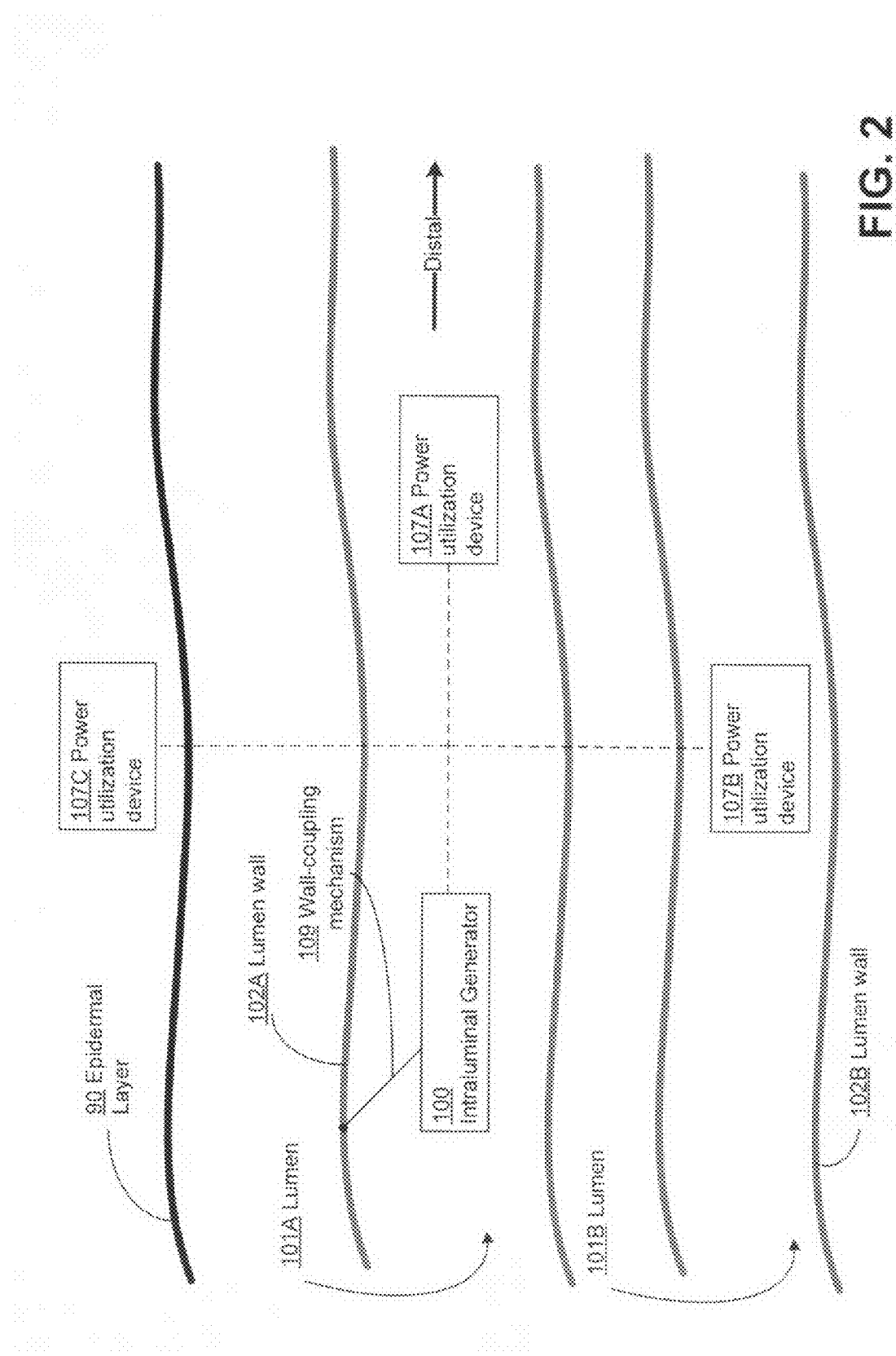
FIG. 2 shows a high-level block diagram of an intraluminal power generation system.
Figure 3:
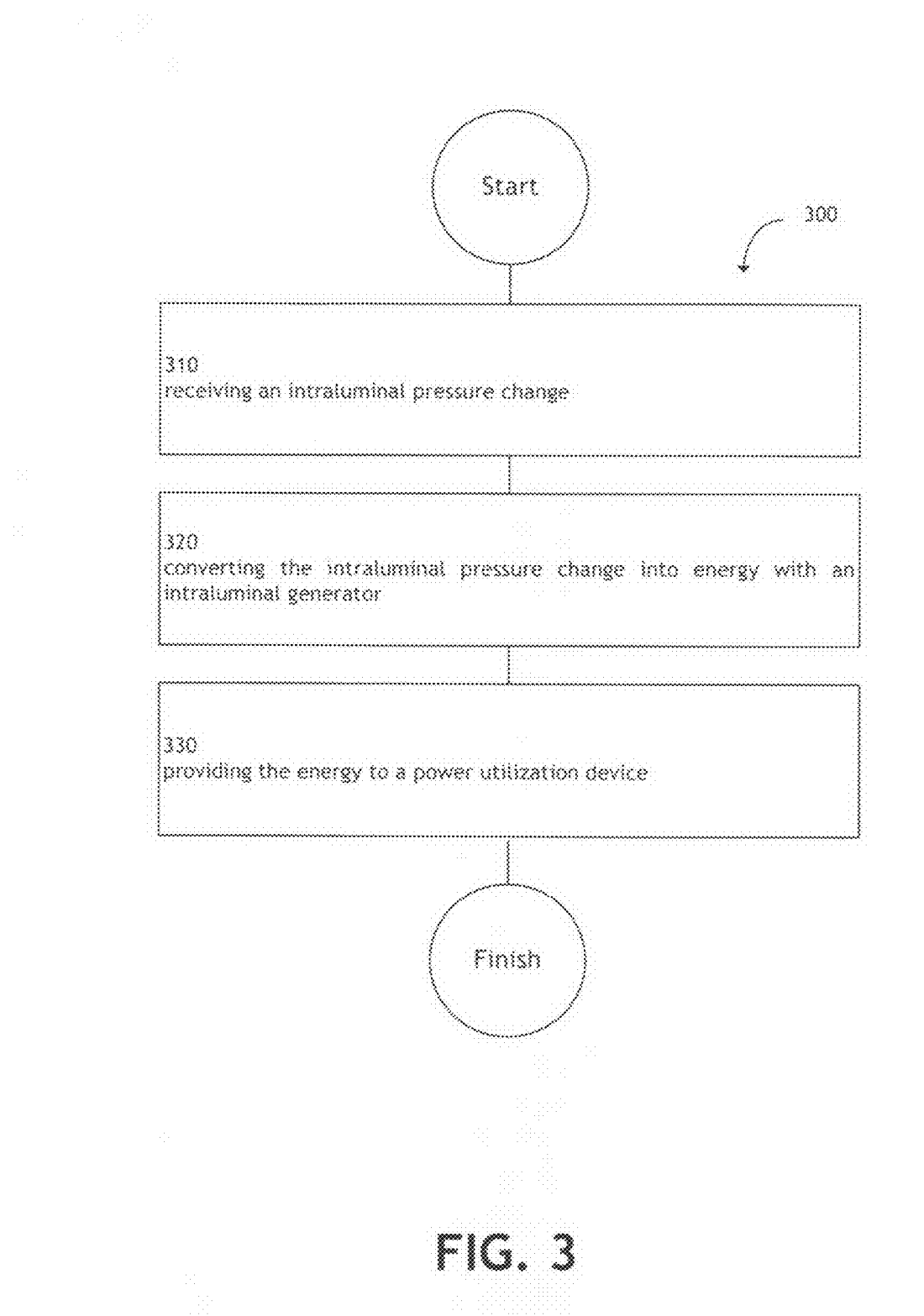
FIG. 3 is a high-level logic flowchart of a process.
Figure 4:
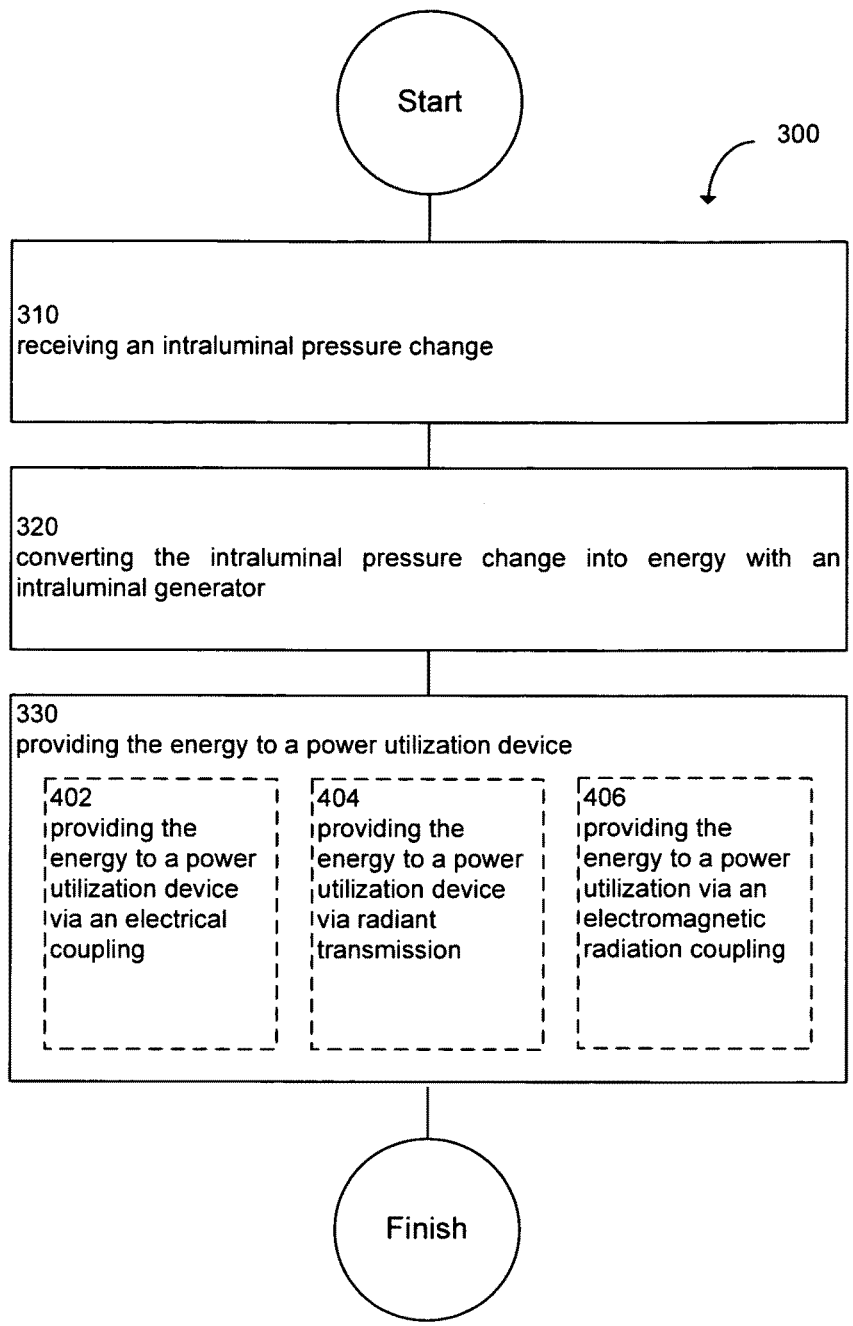
FIG. 4 is a high-level logic flowchart of a process.
Figure 5:
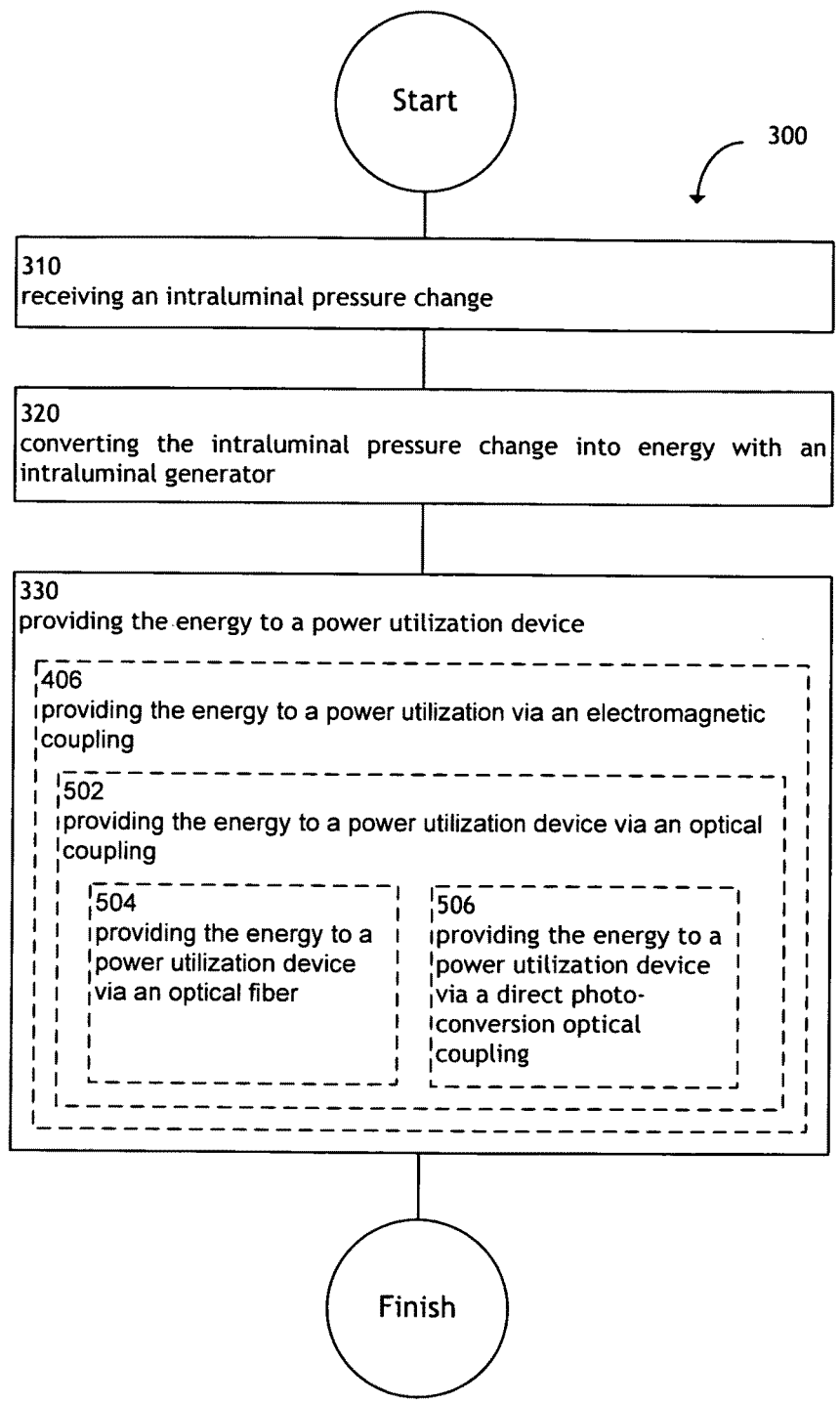
FIG. 5 is a high-level logic flowchart of a process.
Figure 6:
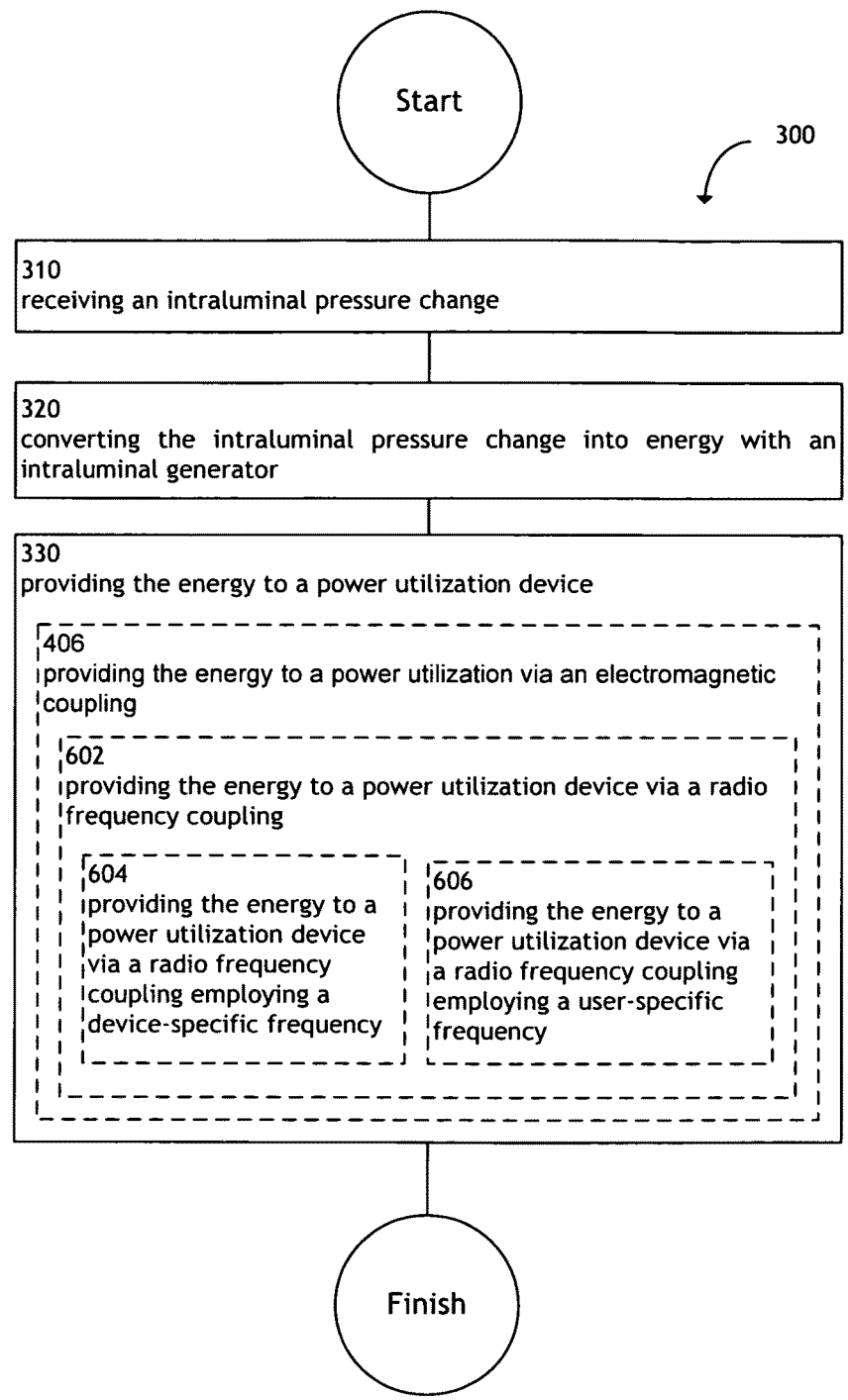
FIG. 6 is a high-level logic flowchart of a process.
Figure 7:
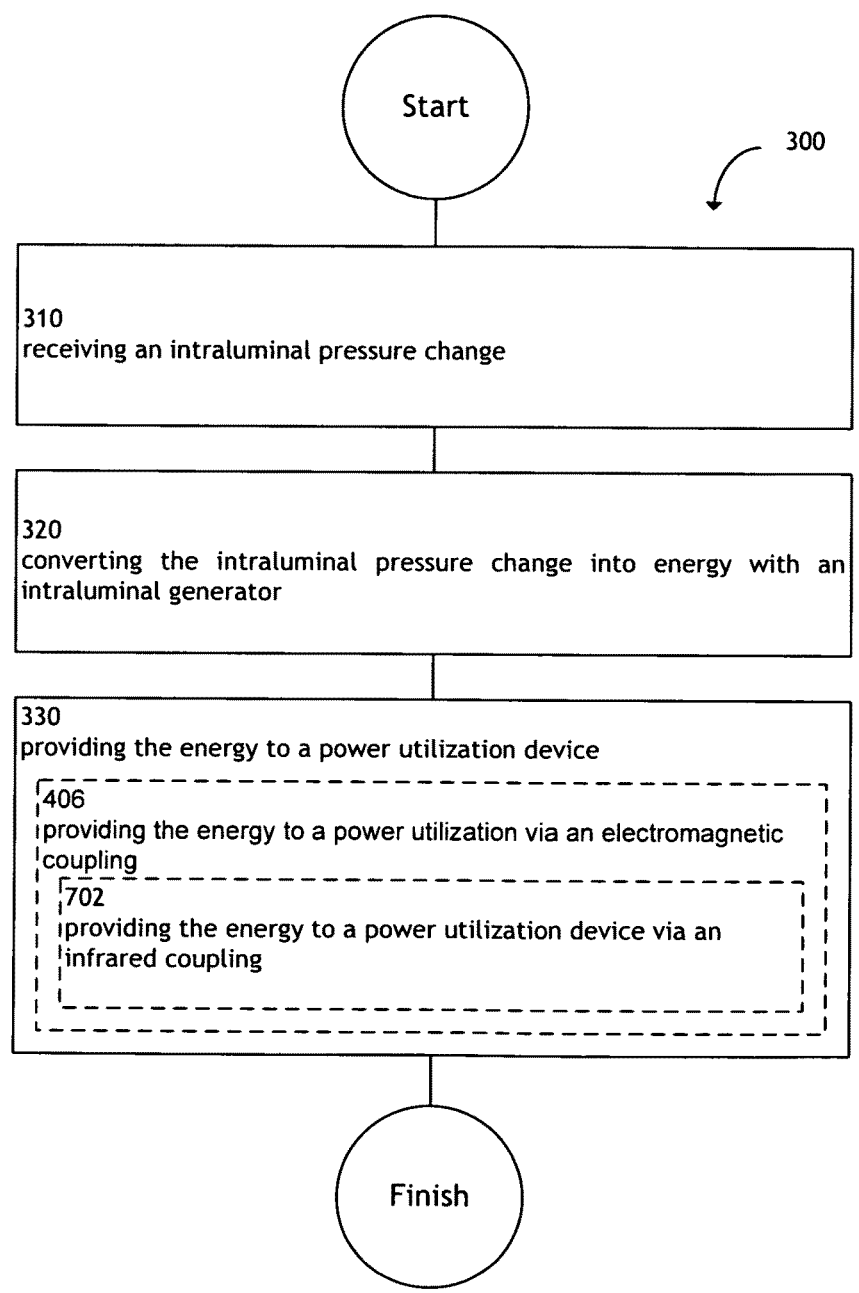
FIG. 7 is a high-level logic flowchart of a process.
Figure 8:
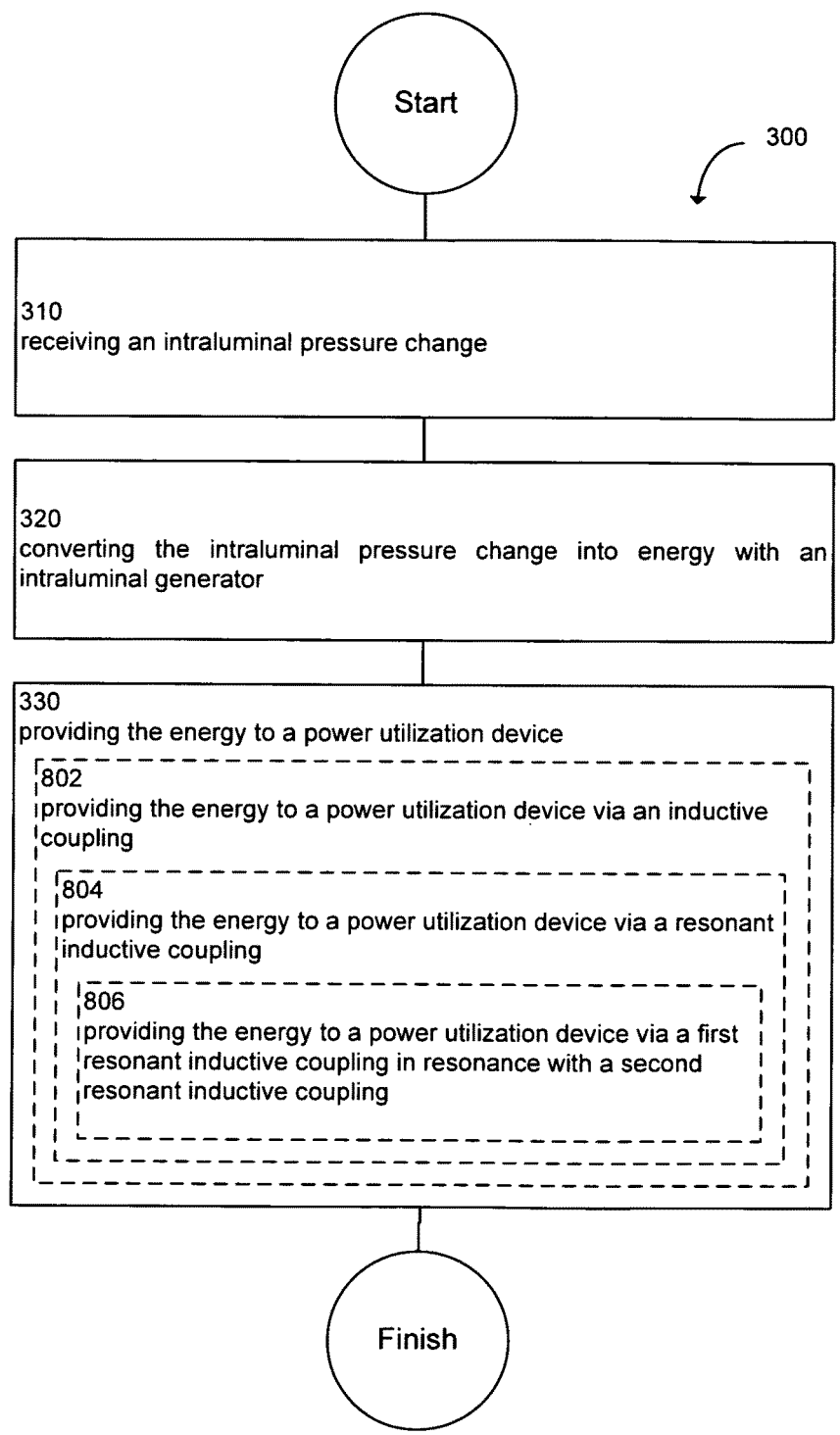
FIG. 8 is a high-level logic flowchart of a process.
Figure 9:
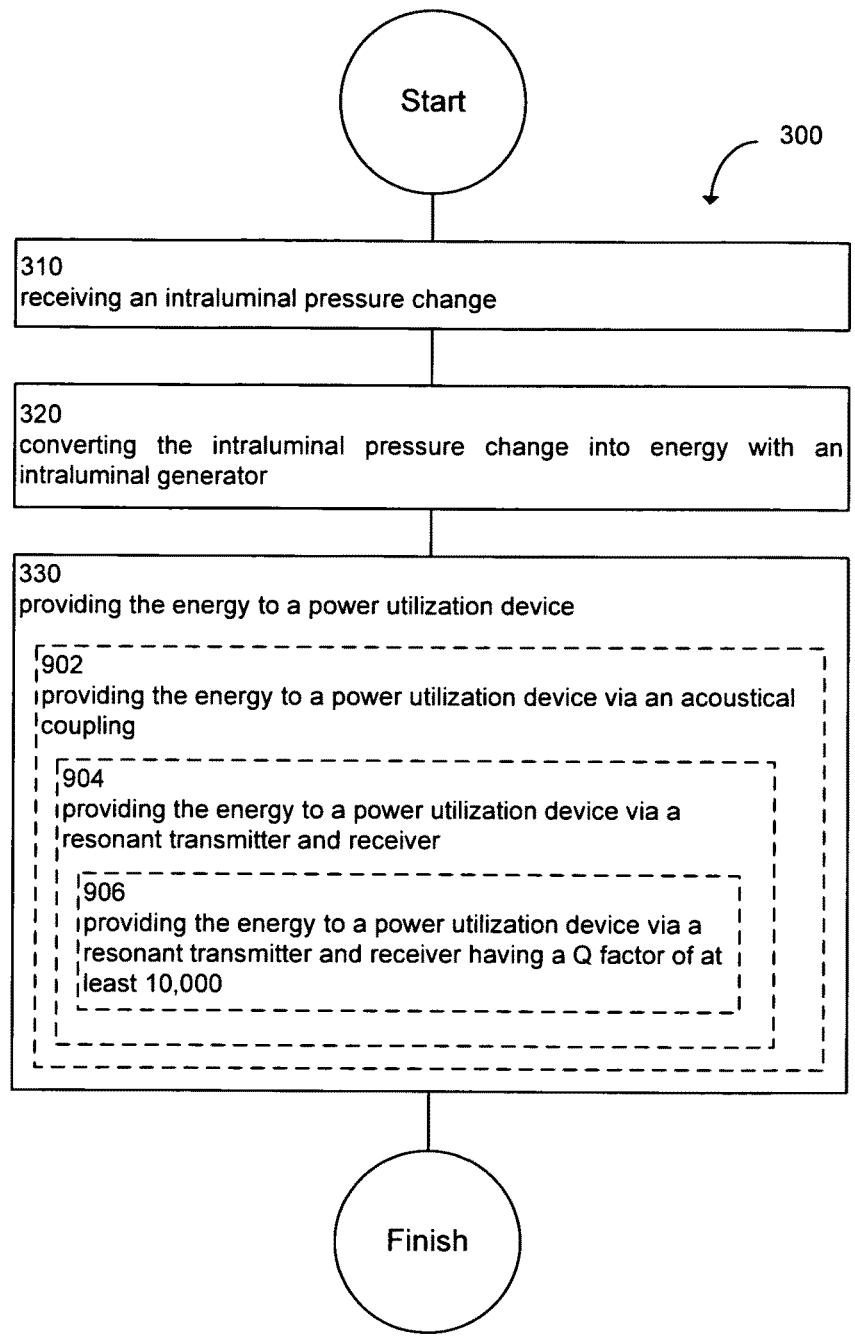
FIG. 9 is a high-level logic flowchart of a process.
Figure 10:
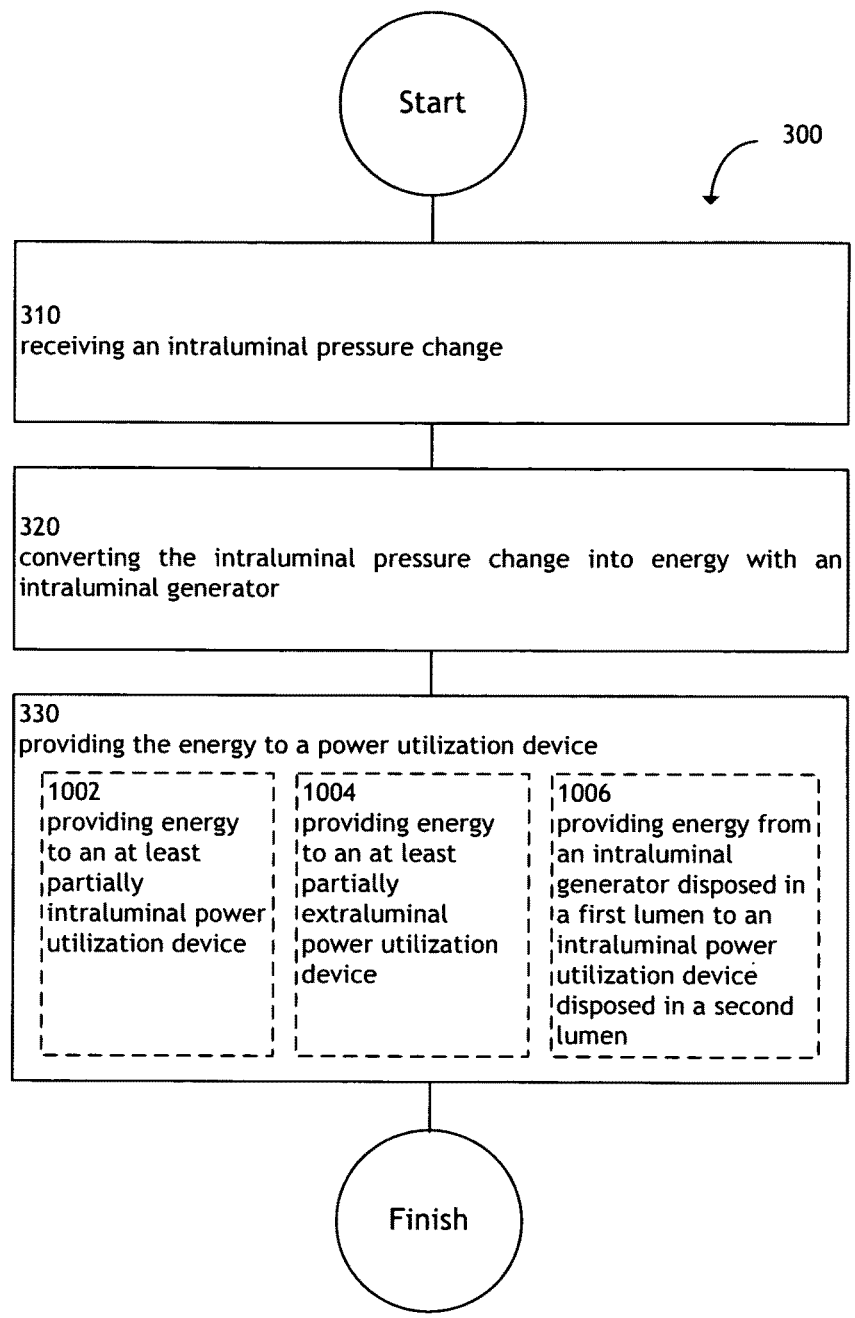
FIG. 10 is a high-level logic flowchart of a process.
Figure 11:
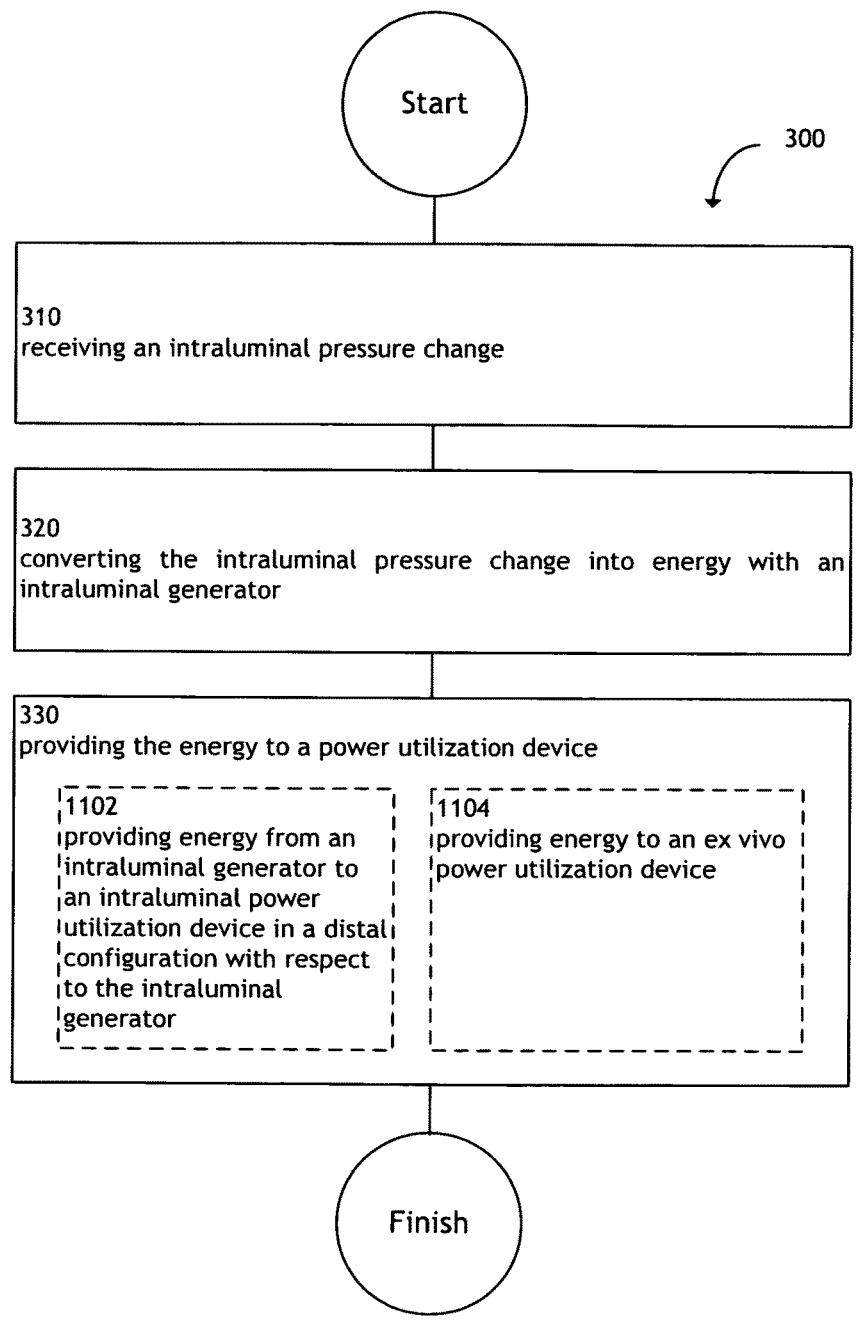
FIG. 11 is a high-level logic flowchart of a process.
Figure 12:
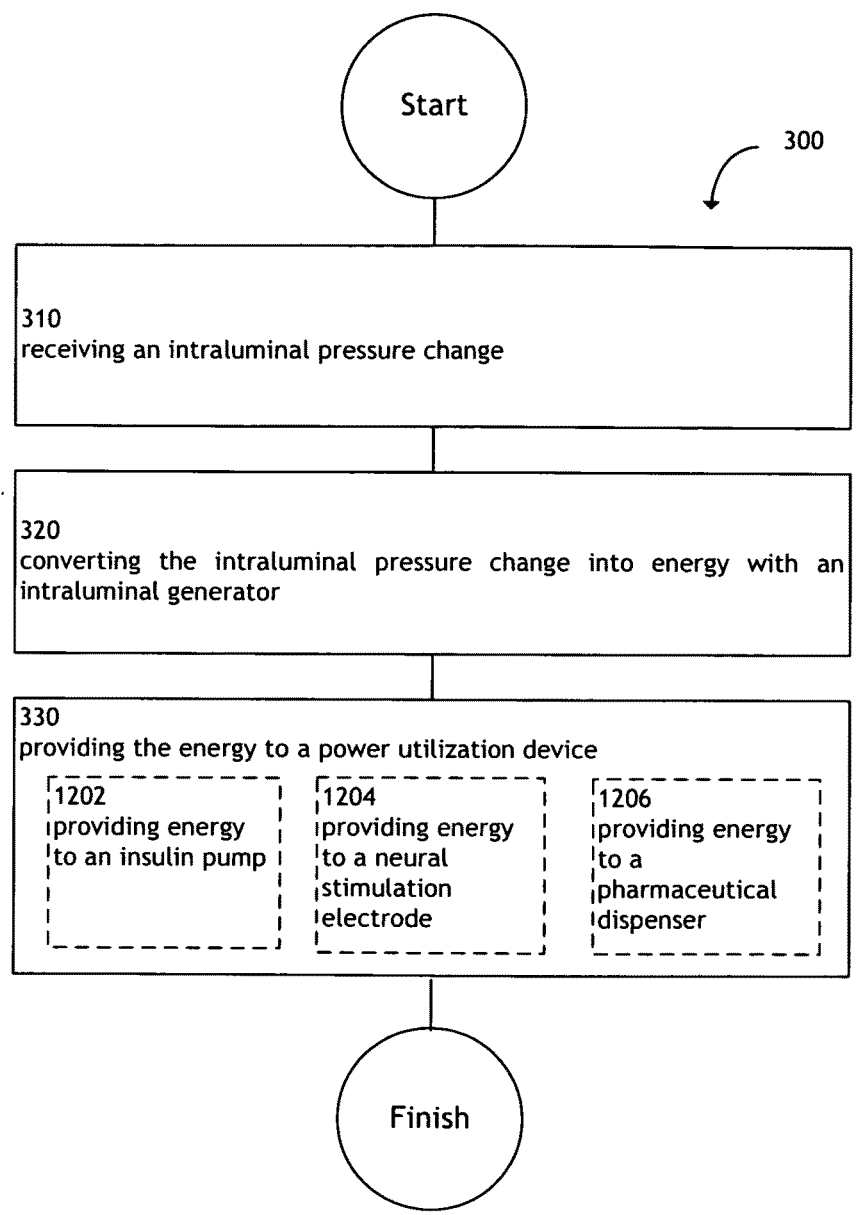
FIG. 12 is a high-level logic flowchart of a process.
Figure 13:
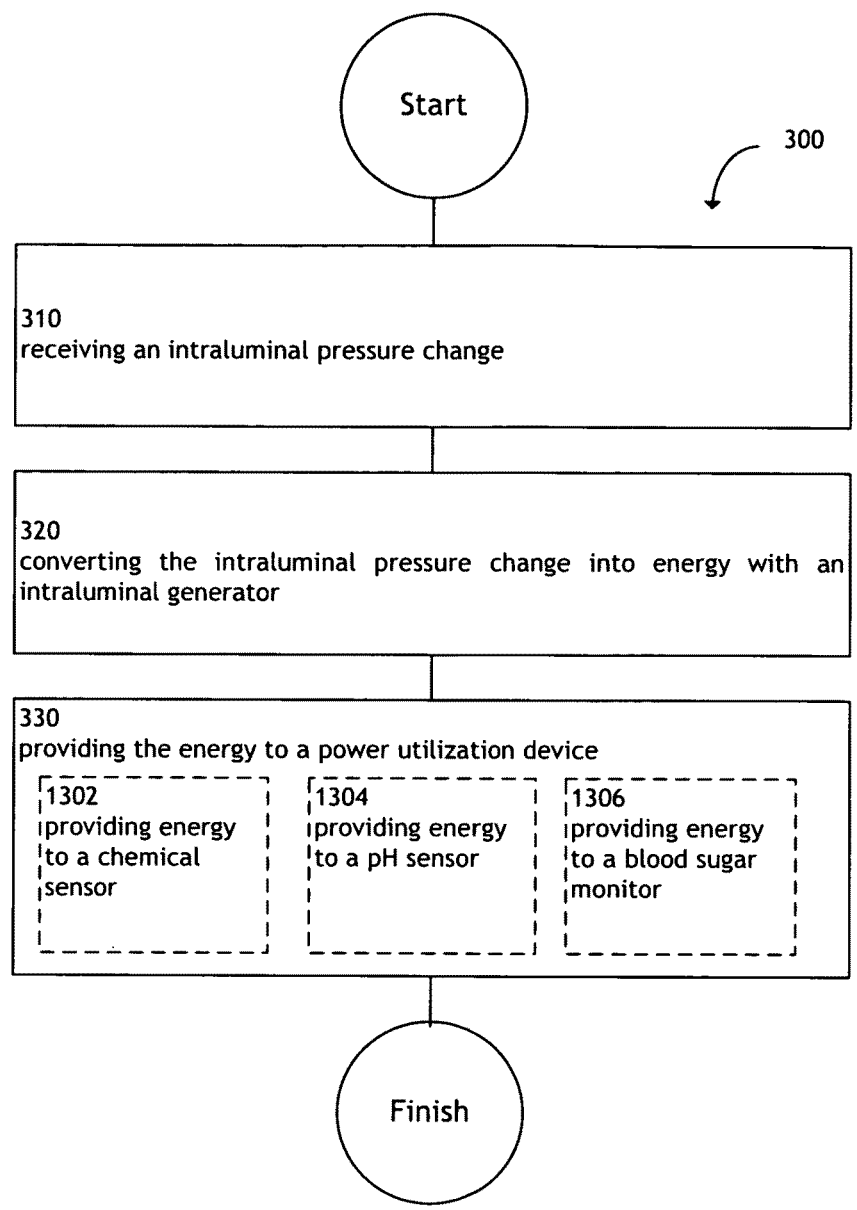
FIG. 13 is a high-level logic flowchart of a process.
Figure 14:
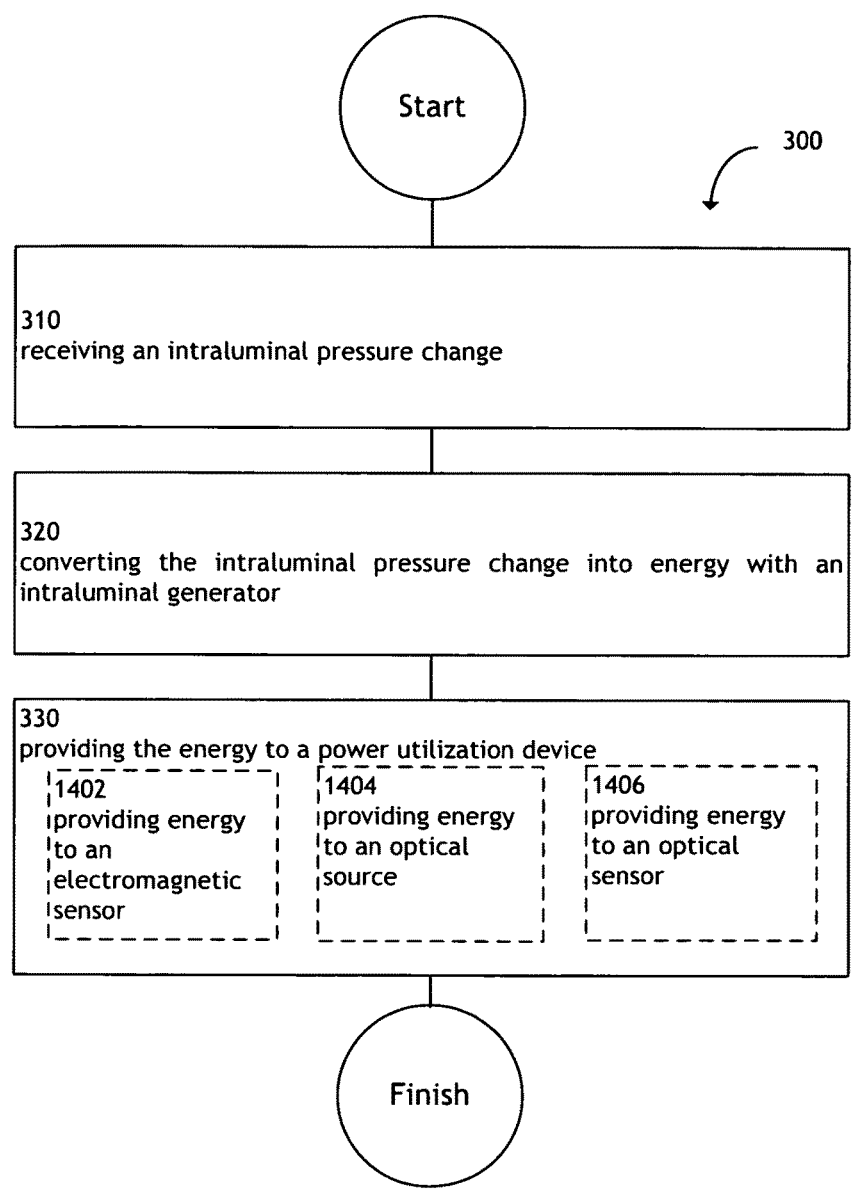
FIG. 14 is a high-level logic flowchart of a process.
Figure 15:
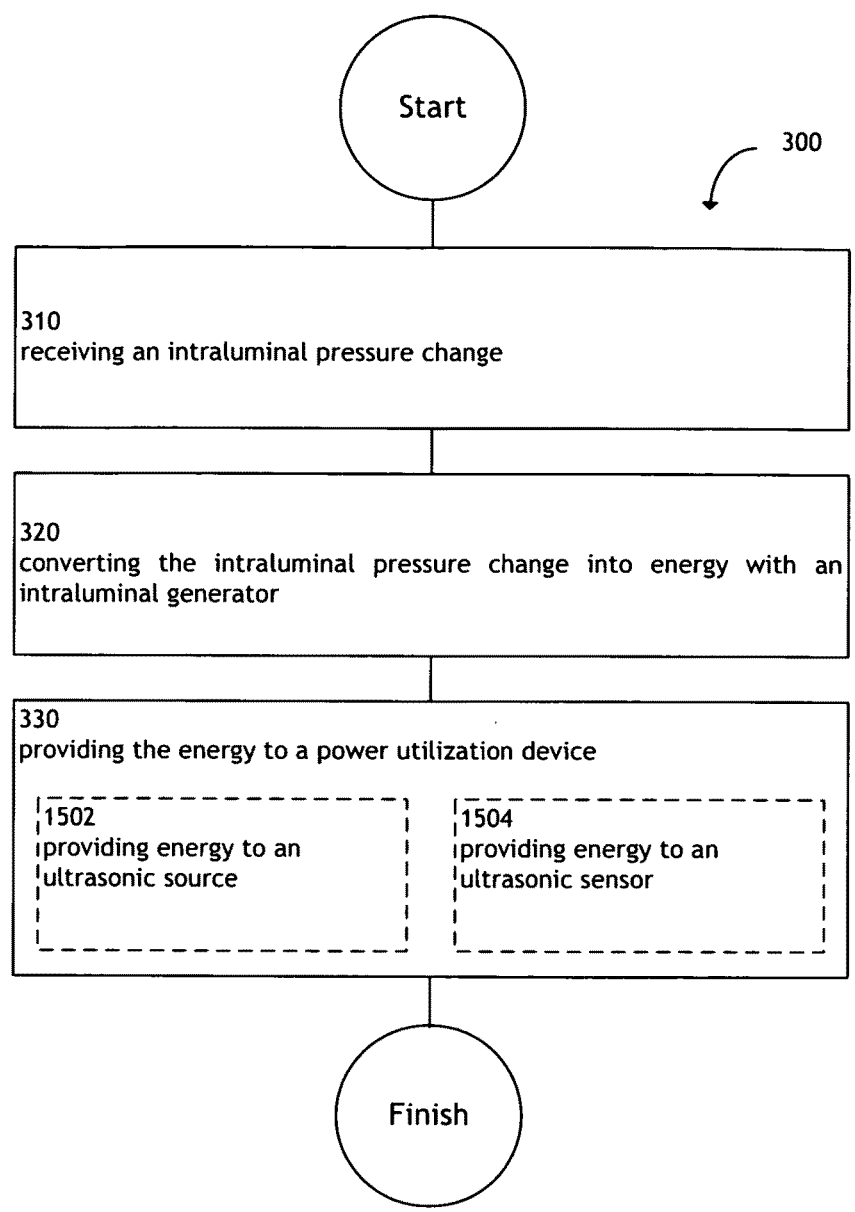
FIG. 15 is a high-level logic flowchart of a process.
Figure 16:
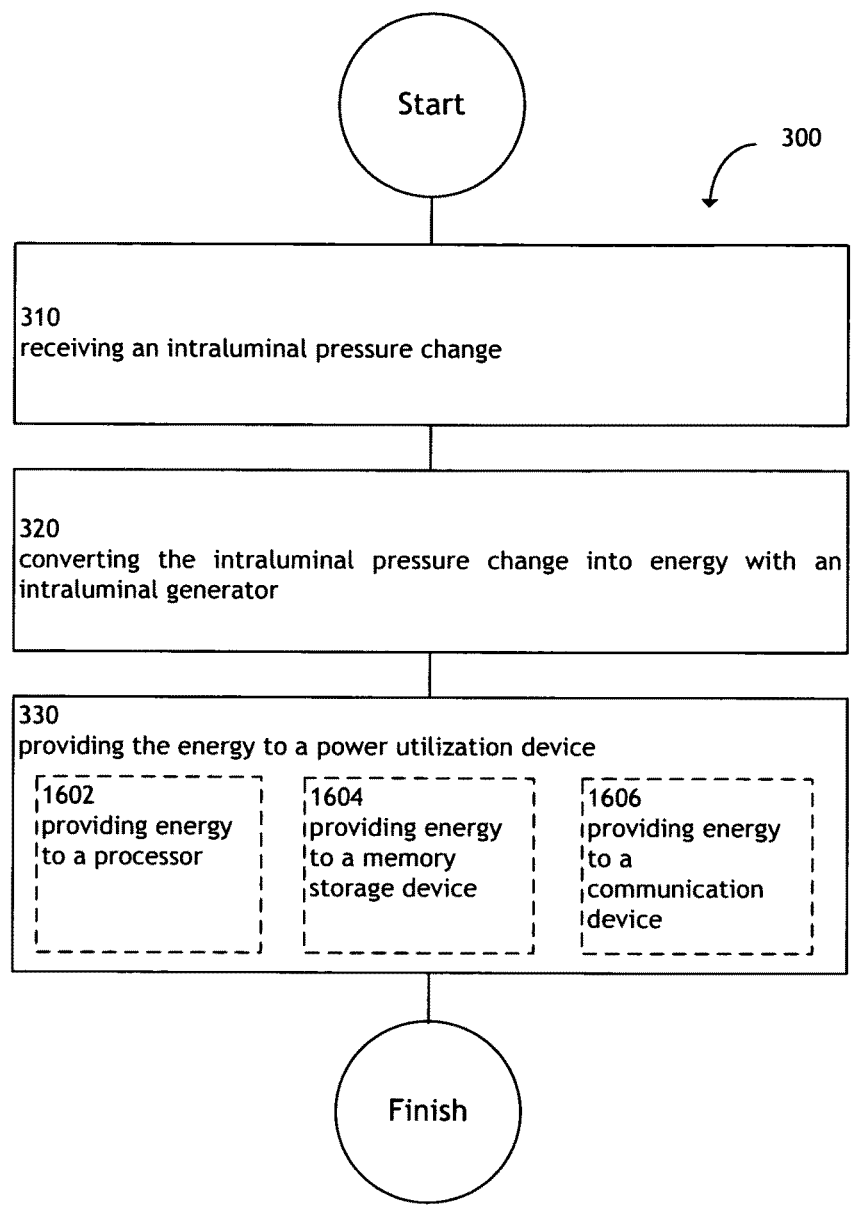
FIG. 16 is a high-level logic flowchart of a process.
Figure 17:
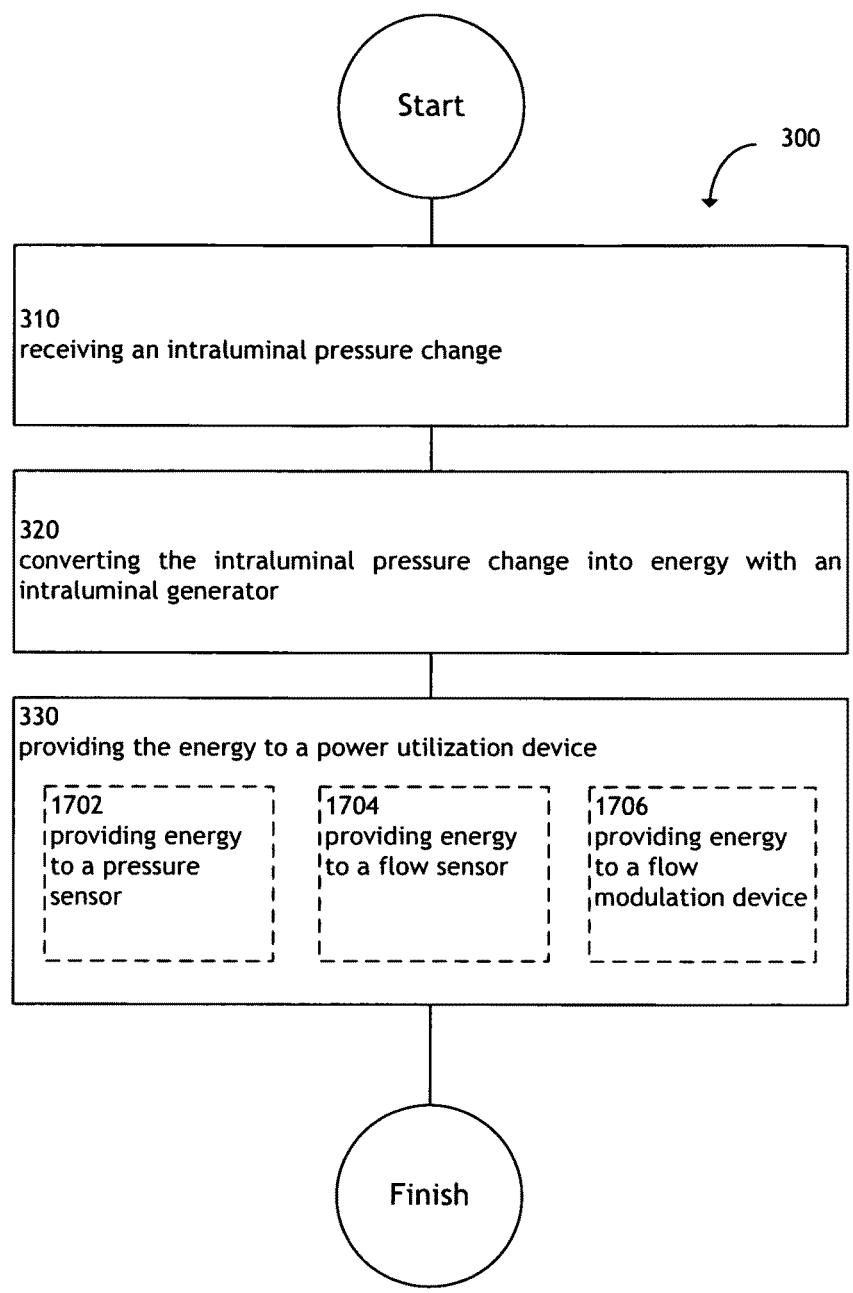
FIG. 17 is a high-level logic flowchart of a process.
Figure 18:
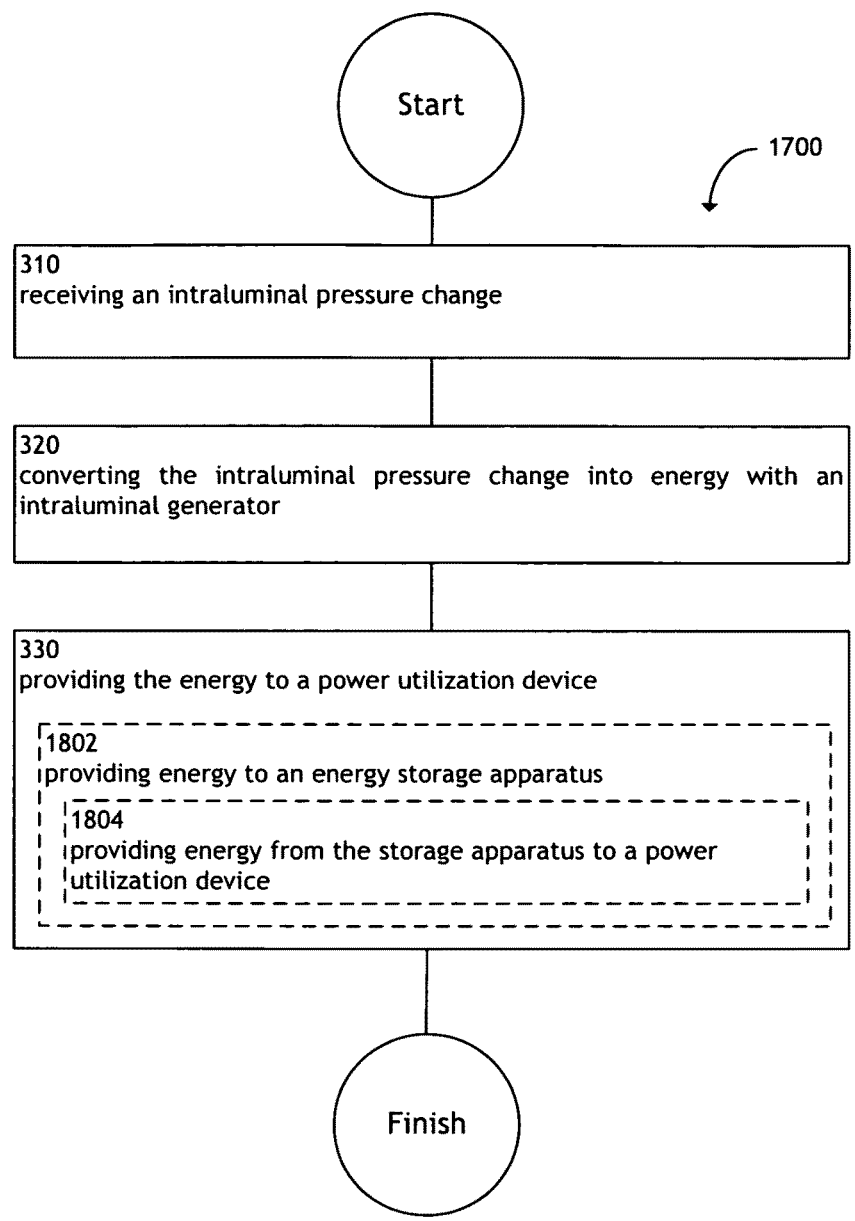
FIG. 18 is a high-level logic flowchart of a process.
Figure 19:
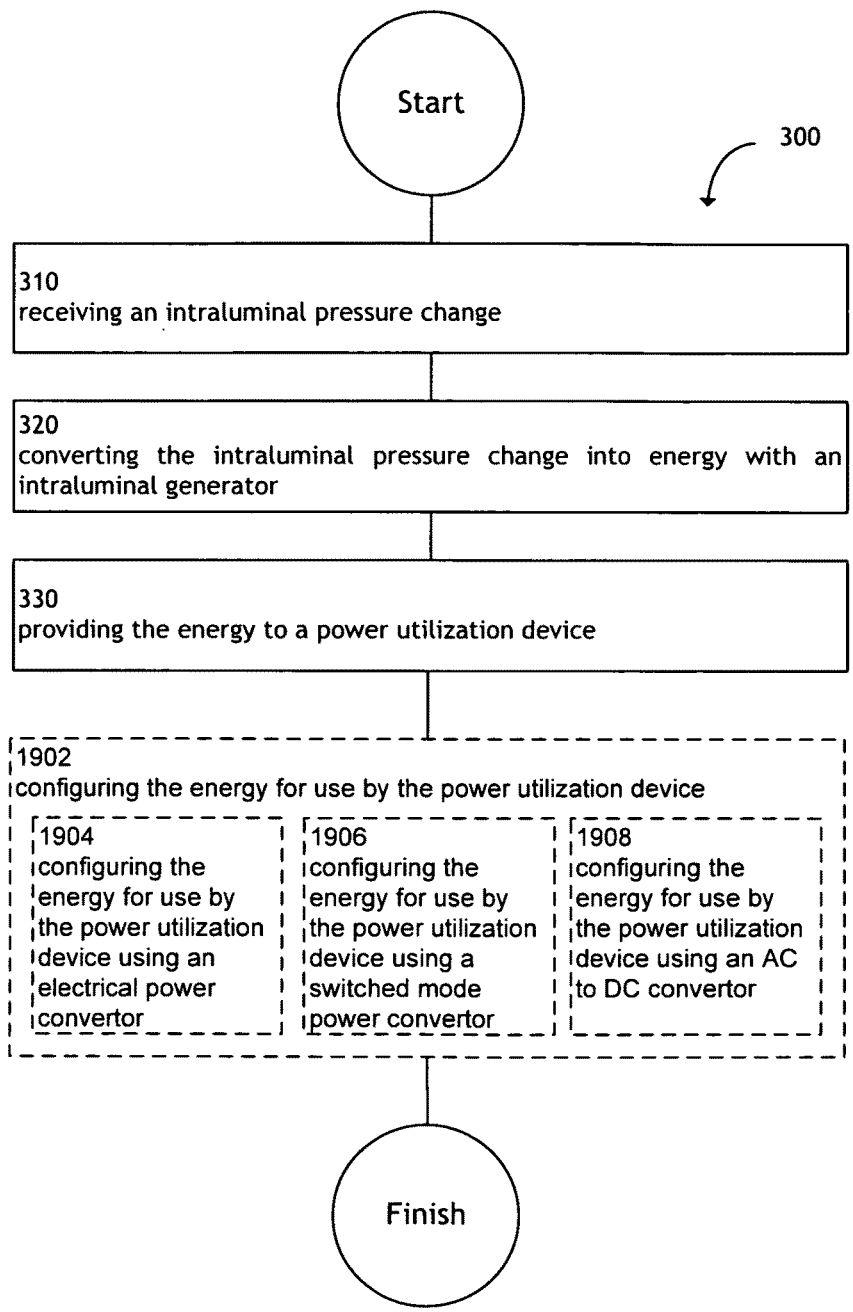
FIG. 19 is a high-level logic flowchart of a process.
Figure 20:
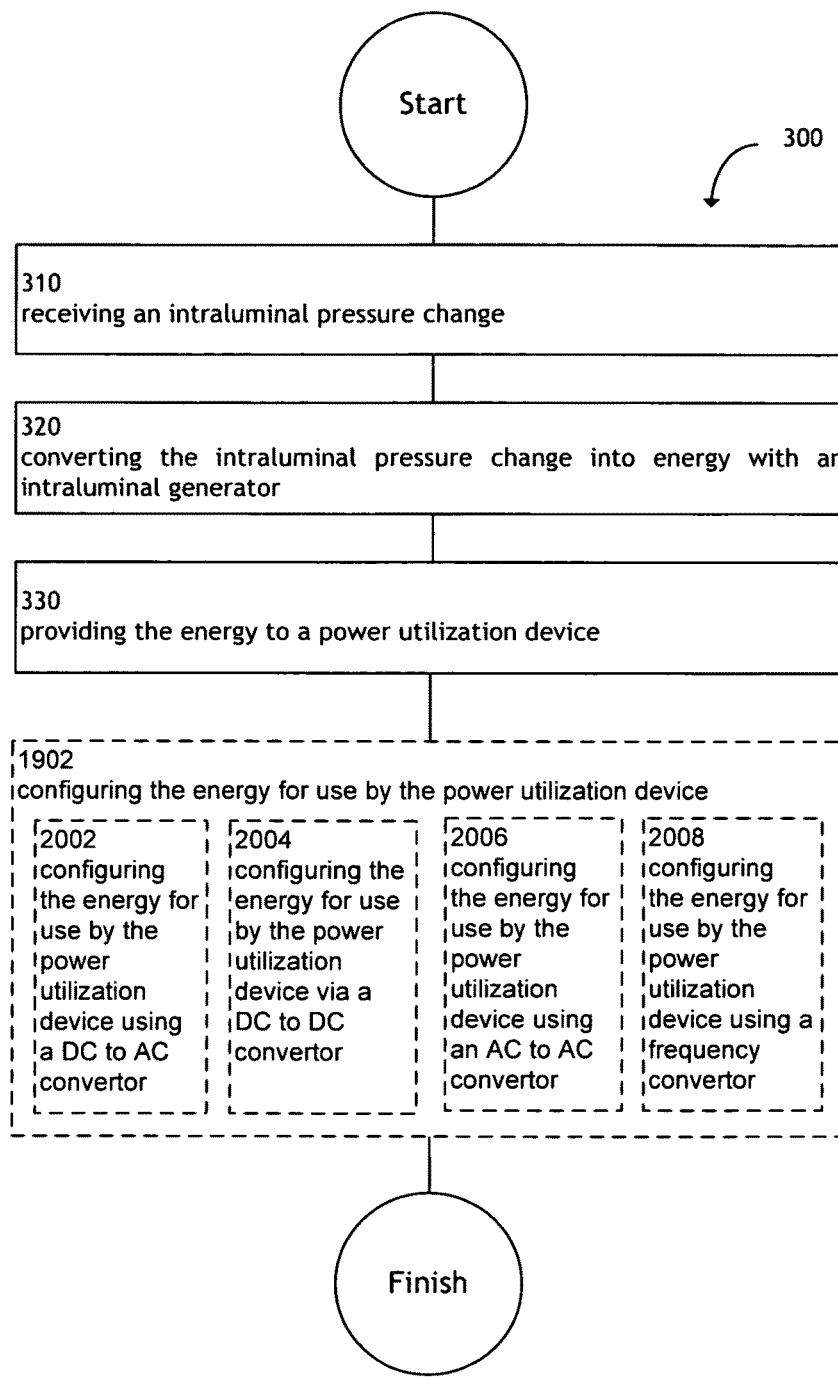
FIG. 20 is a high-level logic flowchart of a process.
Figure 21:
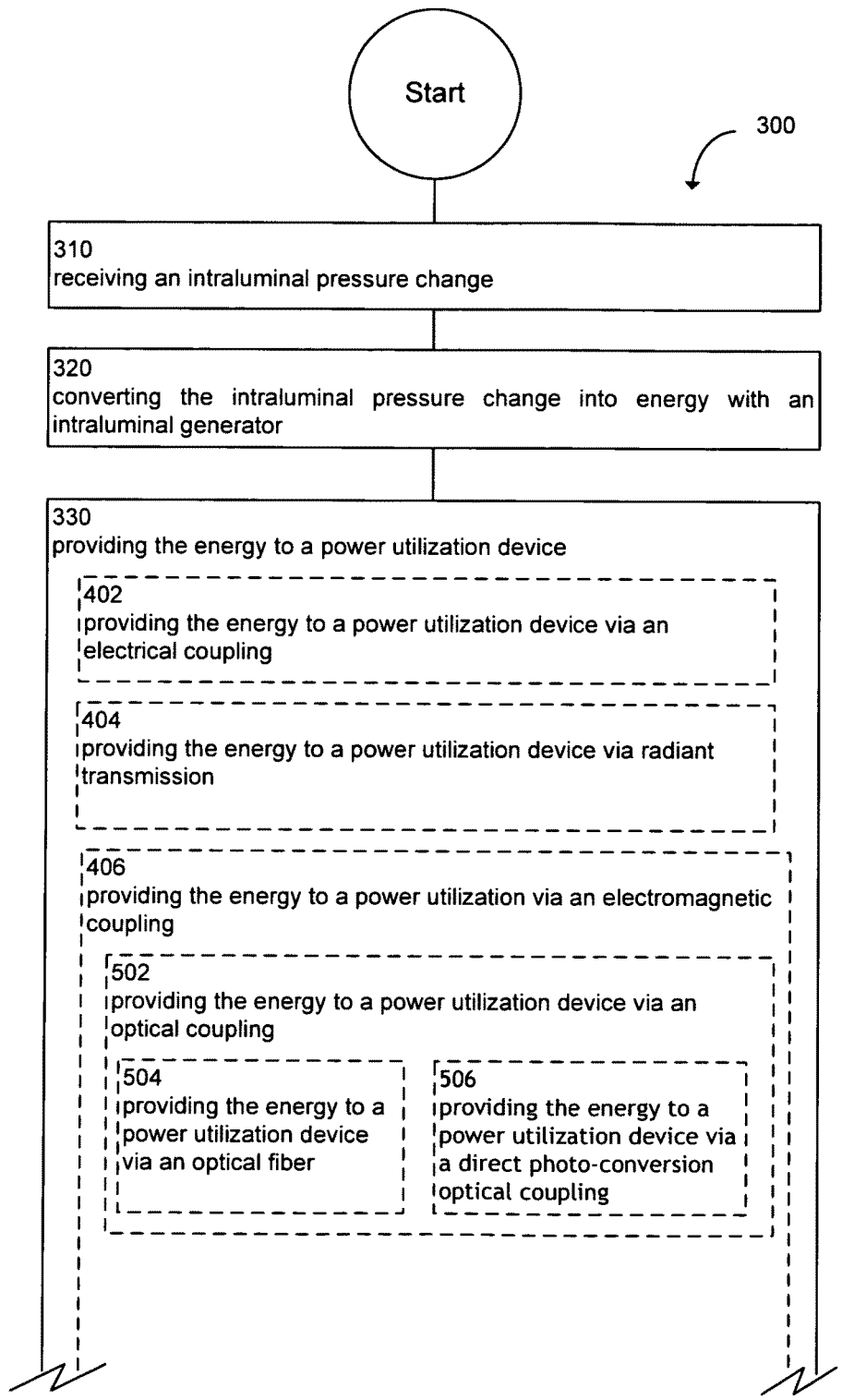
FIG. 21 is a high-level logic flowchart of a process.
Figure 21:
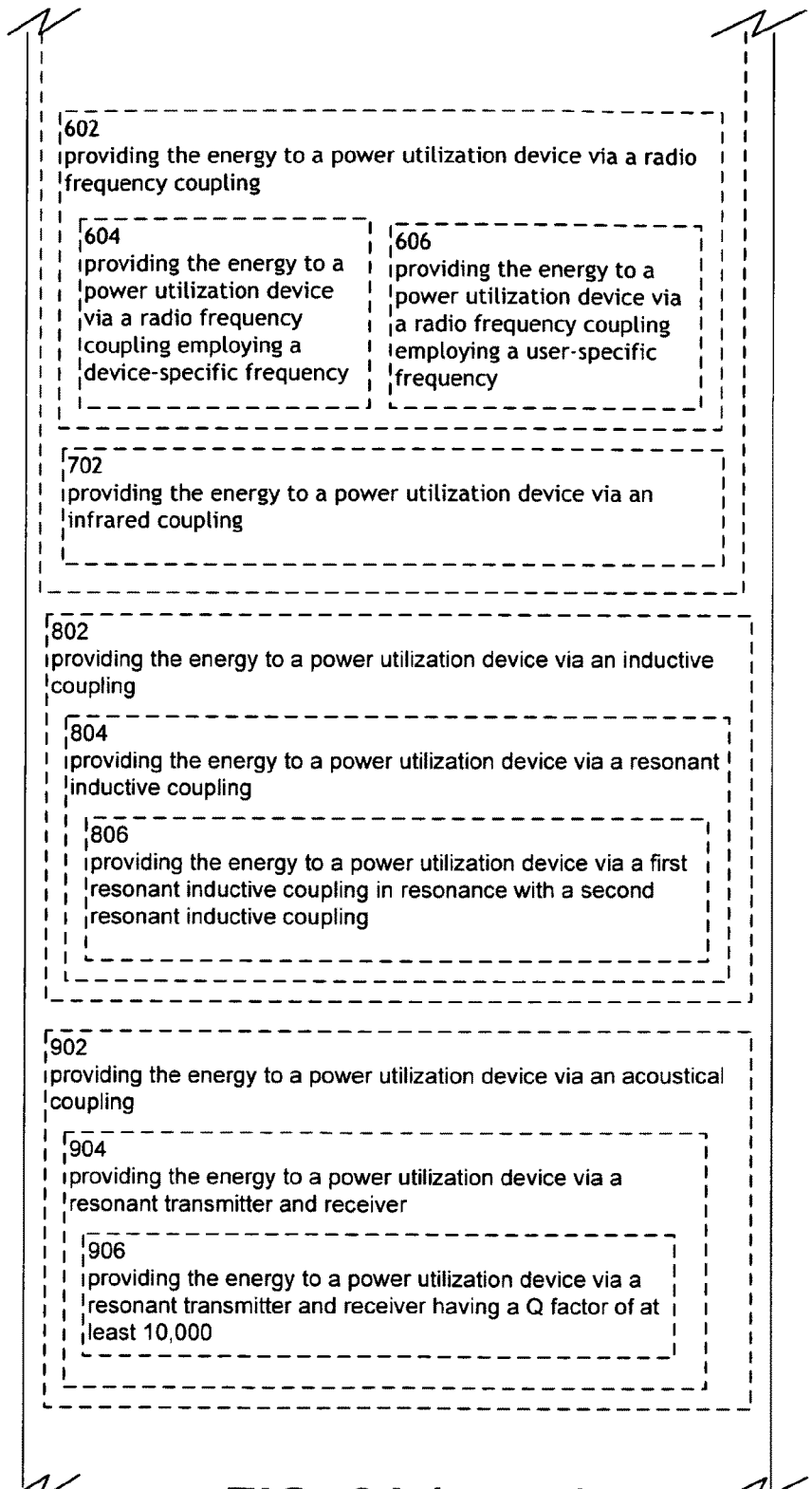
Figure 21:
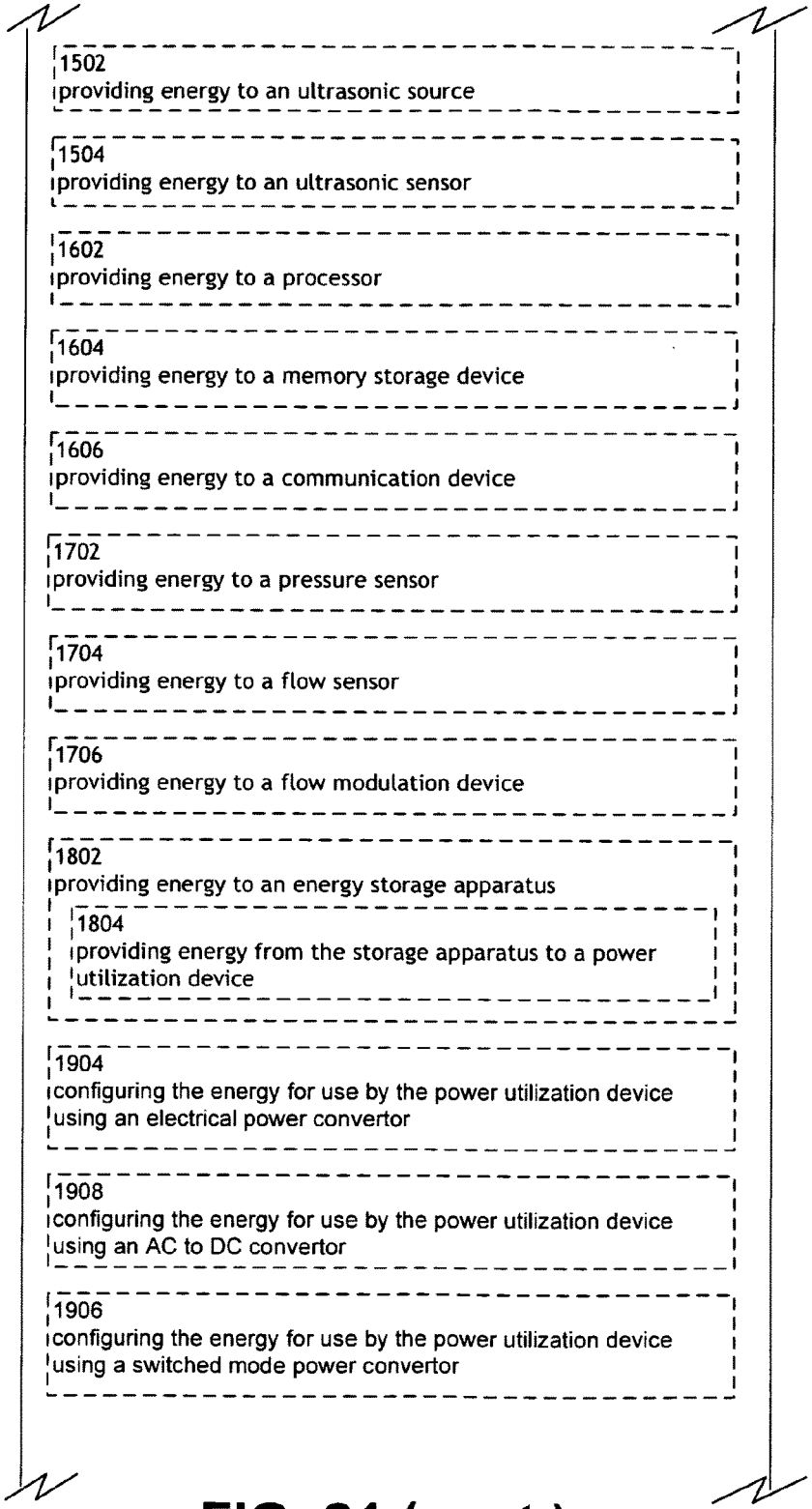
Figure 21:
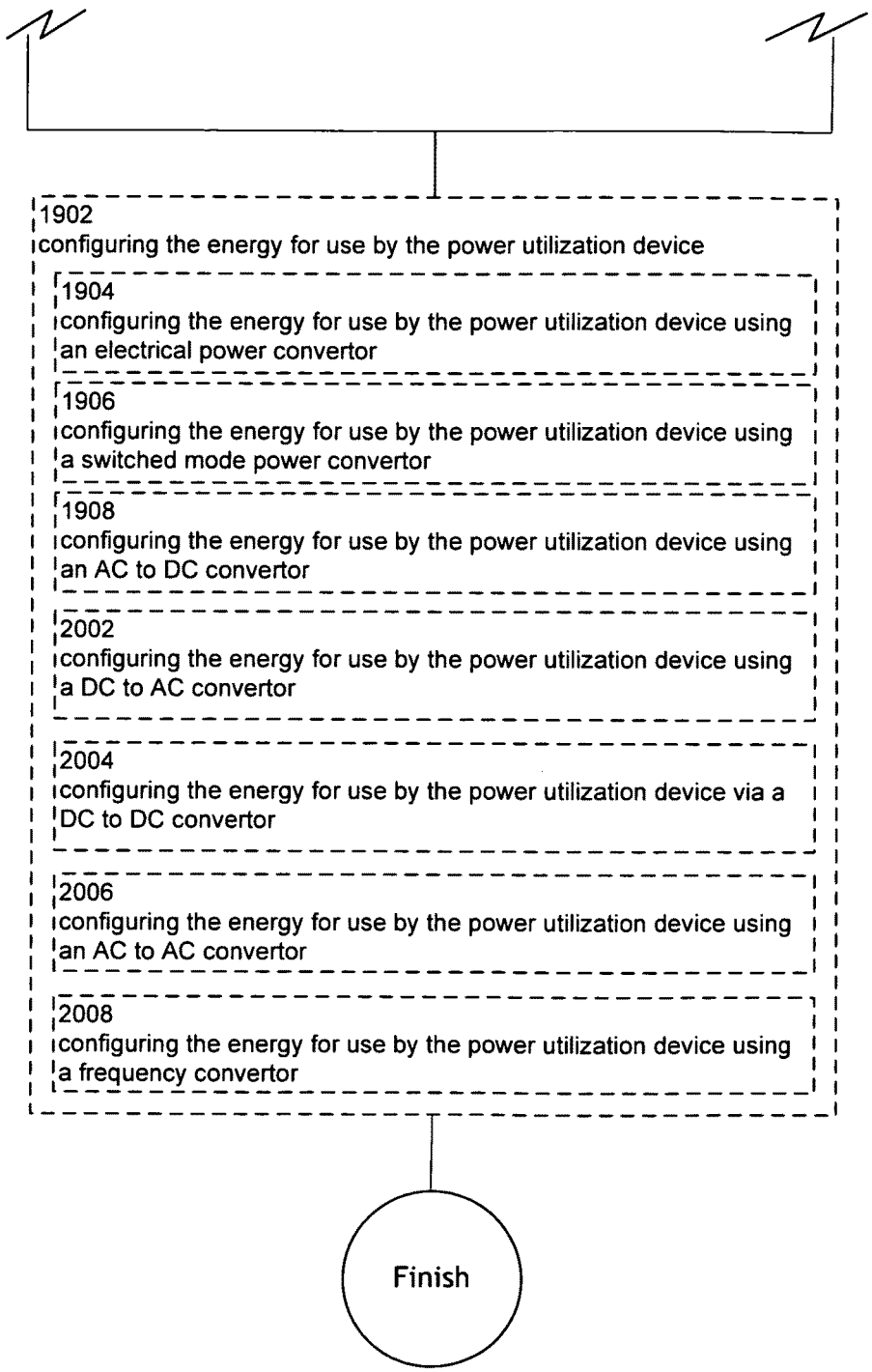

FIGS. 1 and 2 illustrate example environments in which one or more technologies may be implemented. An intraluminal power generation device may comprise intraluminal generator 100 configured for disposal within an anatomical lumen 101 defined by a lumen wall 102. The intraluminal generator 100 may be configured to convert a varying intraluminal pressure into energy (e.g. electrical energy, mechanical/elastic energy, chemical energy, thermal energy).

The intraluminal generator 100 may include an integrated pressure change receiving structure 103A configured to receive a pressure change associated with a fluid pressure within the lumen 101. Alternately, the pressure change receiving structure 103 may be an external pressure change receiving structure 103B operably coupled to the intraluminal generator 100 via a coupling 104 to transfer a received pressure from the pressure change receiving structure 103B to the intraluminal generator 100 in a form which the intraluminal generator 100 may convert to energy.

The intraluminal power generation device may comprise an energy storage apparatus 105 for storage of energy generated by the intraluminal generator 100. The energy storage apparatus 105 may be operably coupled to the intraluminal generator 100 by a coupling 106.

The intraluminal power generation device may comprise a power utilization device 107 that may use energy generated by the intraluminal generator 100 and/or stored in the energy storage apparatus 105 to carry out a desired function. The power utilization device 107 may be operably coupled to the intraluminal generator 100 and/or an energy storage apparatus 105 by a coupling 108.

FIG. 2 illustrates various configurations of one or more components of an intraluminal power generation device. The intraluminal generator 100 may be operably coupled to power utilization device 107A disposed in a first lumen 101A (e.g. in a distal relationship to the power utilization device 107A). An intraluminal generator 100 disposed within in a first lumen 101A may be operably coupled to power utilization device 107B disposed in a second lumen 101B. An intraluminal generator 100 disposed within in a first lumen 101A may be operably coupled to an ex vivo power utilization device 107C disposed outside an epidermis layer.

Referring to FIGS. 1-3 and 21, the intraluminal generator 100 may be a generator configured for intraluminal disposal. For example, as shown in FIG. 1, the intraluminal generator 100 may be disposed (e.g. surgically implanted) within in a lumen 101. The intraluminal generator 100 may be coupled to the wall of the lumen 101 to maintain the intraluminal generator 100 in place. The intraluminal generator 100 may comprise biocompatible materials (e.g. ultra high molecular weight polyethylene, polysulfone, polypropylene, titanium, and the like) such that the intraluminal generator 100 may be suitable for disposal within the lumen 101. The exterior surface of the intraluminal generator 100 may be configured such that the flow characteristics of a fluid moving through the lumen 101 are substantially maintained (e.g. the flow rate of the fluid, the flow dynamics of the fluid, and the like are not substantially disrupted.) The intraluminal generator 100 may be a stent-type structure.

A movement and/or deformation of the pressure change receiving structure 103 may be translated either directly (e.g. the intraluminal generator 100 comprises the pressure change receiving structure 103A) or indirectly (e.g. the pressure change receiving structure 103B is operably coupled to a generator) into energy either through the motion of the pressure change receiving structure 103 and/or the electrical properties of the materials comprising the pressure change receiving structure 103.

Referring to FIGS. 1-3 and 21, a change in pressure within the lumen 101 may be received by a pressure change receiving structure 103. The pressure change receiving structure 103 may receive a change in pressure through exposure of a surface of the pressure change receiving structure 103 to the luminal environment such that a change in the intraluminal pressure may exert a force on the pressure change receiving structure 103 thereby resulting in a movement and/or deformation of the pressure change receiving structure 103.

Referring to FIGS. 1-3 and 21, a movement and/or deformation of the pressure change receiving structure 103 may be translated either directly (e.g. the intraluminal generator 100 comprises the pressure change receiving structure 103A) or indirectly (e.g. the pressure change receiving structure 103B is operably coupled to a generator) into energy either through the motion of the pressure change receiving structure 103 and/or the electrical properties of the materials comprising the pressure change receiving structure 103 and/or the intraluminal generator 100.

Referring to FIGS. 1-3 and 21, energy generated by the intraluminal generator 100 in response to the movement and/or deformation of the pressure change receiving structure 103 may be provided to one or more devices (e.g. a power utilization device 107) which may require one or more types of energy (e.g. electromagnetic, kinetic) to perform a function.

Referring to FIGS. 1-4 and 21, energy generated by the intraluminal generator 100 in response to the movement and/or deformation of the pressure change receiving structure 103 may be transmitted to a power utilization device 107 operably coupled to the intraluminal generator 100 by an electrical coupling 106 (e.g. one or more wires).

Referring to FIGS. 1-4 and 21, energy generated by the intraluminal generator 100 in response to the movement and/or deformation of the pressure change receiving structure 103 may be transmitted to a power utilization device 107 operably coupled to the intraluminal generator 100 by a coupling 106. One or more of the intraluminal generator 100 and the power utilization device 107 may comprise one or more of an radiant transmitter (e.g. a light-emitting diode, a radio transmitter, an acoustical transmitter) and an radiant receiver (e.g. a photo detector, a radio receiver, and the like) whereby energy may be transmitted via radiant signals transceived between the intraluminal generator 100 and the power utilization device 107.

Referring to FIGS. 1-4 and 21, energy generated by the intraluminal generator 100 in response to the movement and/or deformation of the pressure change receiving structure 103 may be transmitted to a power utilization device 107 operably coupled to the intraluminal generator 100 by a electromagnetic radiation (EMR) coupling 106. One or more of the intraluminal generator 100 and the power utilization device 107 may comprise one or more of an EMR transmitter (e.g. a radio transmitter) and an EMR receiver (e.g. a radio receiver) whereby energy may be transmitted via EMR signals transceived between the intraluminal generator 100 and the power utilization device 107.

Referring to FIGS. 1-5 and 21, energy generated by the intraluminal generator 100 in response to the movement and/or deformation of the pressure change receiving structure 103 may be transmitted to a power utilization device 107 operably coupled to the intraluminal generator 100 by an optical coupling 106. One or more of the intraluminal generator 100 and the power utilization device 107 may comprise one or more of an optical transmitter (e.g. a light-emitting diode, a laser diode and the like) and an optical receiver (e.g. a photo diode, a photo detector and the like) whereby energy may be transmitted via EMR signals in the visible-light spectrum are transceived between the intraluminal generator 100 and the power utilization device 107.

Referring to FIGS. 1-5 and 21, energy generated by the intraluminal generator 100 in response to the movement and/or deformation of the pressure change receiving structure 103 may be transmitted to a power utilization device 107 operably coupled to the intraluminal generator 100 by an optical fiber coupling 106. One or more of the intraluminal generator 100 and the power utilization device 107 may comprise one or more of an optical transmitter (e.g. a light-emitting diode, a laser diode and the like) and an optical receiver (e.g. a photo diode, a photo detector and the like) whereby energy may be transmitted via optical signals transceived between the intraluminal generator 100 and the power utilization device 107 via the optical fiber coupling 106.

Referring to FIGS. 1-5 and 21, energy generated by the intraluminal generator 100 in response to the movement and/or deformation of the pressure change receiving structure 103 may be transmitted to a power utilization device 107 operably coupled to the intraluminal generator 100 by an optical coupling 106. One or more of the intraluminal generator 100 and the power utilization device 107 may comprise one or more of an optical transmitter (e.g. a light-emitting diode, a laser diode and the like) and an optical receiver (e.g. a photo diode, a photo detector and the like) whereby energy may be transmitted via optical signals transceived between the intraluminal generator 100 and the power utilization device 107.

Referring to FIGS. 1-4, 6 and 21, energy generated by the intraluminal generator 100 in response to the movement and/or deformation of the pressure change receiving structure 103 may be transmitted to a power utilization device 107 operably coupled to the intraluminal generator 100 by an electromagnetic radiation (EMR) coupling 106. One or more of the intraluminal generator 100 and the power utilization device 107 may comprise one or more of an EMR transmitter and an EMR receiver whereby energy may be transmitted via EMR signals in the radio-frequency spectrum transceived between the intraluminal generator 100 and the power utilization device 107.

Referring to FIGS. 1-4, 6 and 21, energy generated by the intraluminal generator 100 in response to the movement and/or deformation of the pressure change receiving structure 103 may be transmitted to a power utilization device 107 operably coupled to the intraluminal generator 100 by an electromagnetic radiation (EMR) coupling 106. One or more of the intraluminal generator 100 and the power utilization device 107 may comprise one or more of an EMR transmitter and an EMR receiver whereby energy may be transmitted via EMR signals in the radio-frequency spectrum transceived between the intraluminal generator 100 and the power utilization device 107 at a frequency associated with the power utilization device 107 so as to avoid interference with a second power utilization device (not shown).

Referring to FIGS. 1-4, 6 and 21, energy generated by the intraluminal generator 100 in response to the movement and/or deformation of the pressure change receiving structure 103 may be transmitted to a power utilization device 107 operably coupled to the intraluminal generator 100 by an electromagnetic radiation (EMR) coupling 106. One or more of the intraluminal generator 100 and the power utilization device 107 may comprise one or more of an EMR transmitter and an EMR receiver whereby energy may be transmitted via EMR signals in the radio-frequency spectrum transceived between the intraluminal generator 100 and the power utilization device 107 at a frequency associated with the power utilization device 107 so as to avoid interference with a power utilization device implanted in a user (not shown) distinct from the subject power utilization device 107.

Referring to FIGS. 1-4, 7 and 21, energy generated by the intraluminal generator 100 in response to the movement and/or deformation of the pressure change receiving structure 103 may be transmitted to a power utilization device 107 operably coupled to the intraluminal generator 100 by an electromagnetic radiation (EMR) coupling 106. One or more of the intraluminal generator 100 and the power utilization device 107 may comprise one or more of an EMR transmitter and an EMR receiver whereby energy may be transmitted via EMR signals in the infrared-frequency spectrum transceived between the intraluminal generator 100 and the power utilization device 107.

Referring to FIGS. 1-3, 8 and 21, energy generated by the intraluminal generator 100 in response to the movement and/or deformation of the pressure change receiving structure 103 may be transmitted to a power utilization device 107 operably coupled to the intraluminal generator 100 by an inductive coupling 106. The intraluminal generator 100 may include circuitry (e.g. a solenoid) configured to generate a magnetic field. The power utilization device 107 may include circuitry configured to generate an electrical current when disposed in a location proximate to the magnetic field.

Referring to FIGS. 1-3, 8 and 21, energy generated by the intraluminal generator 100 in response to the movement and/or deformation of the pressure change receiving structure 103 may be transmitted to a power utilization device 107 operably coupled to the intraluminal generator 100 by a resonant inductive coupling 106. The intraluminal generator 100 and the power utilization device 107 may include one or more waveguides configured to transceive evanescent electromagnetic signals. The waveguides may be configured such that a receiving waveguide is in resonance with a transmitting waveguide so as to provide evanescent wave coupling between the waveguides. Upon reception, the evanescent waves may be rectified into DC power for use in the power utilization device 107.

Referring to FIGS. 1-3, 8 and 21, a first intraluminal generator 100 and first power utilization device 107 operably coupled by a first resonant inductive coupling 106 (as described above) may be at least partially co-located with a second intraluminal generator 100 and second power utilization device 107 operably coupled by a second resonant inductive coupling 106 within one or more anatomical structures. In order to avoid interference between the first resonant inductive coupling 106 and the second inductive coupling 106, the waveguides associated with the first resonant inductive coupling 106 and the waveguides associated with the second inductive coupling 106 may be configured so as to be in mutual resonance.

Referring to FIGS. 1-3, 9 and 21, energy generated by the intraluminal generator 100 in response to the movement and/or deformation of the pressure change receiving structure 103 may be transmitted to a power utilization device 107 operably coupled to the intraluminal generator 100 by an acoustical coupling 106. One or more of the intraluminal generator 100 and the power utilization device 107 may comprise one or more of an acoustical transmitter (e.g. an acoustic transducer and the like) and an acoustical receiver (e.g. a hydrophone) whereby energy may be conveyed via acoustical signals transceived between the intraluminal generator 100 and the power utilization device 107.

Referring to FIGS. 1-3, 9 and 21, one or more of the intraluminal generator 100 and the power utilization device 107 may comprise one or more of an acoustical transmitter (e.g. an acoustic transducer and the like) and an acoustical receiver (e.g. a hydrophone) whereby energy may be conveyed via acoustical signals transceived between the intraluminal generator 100 and the power utilization device 107 as described above. The one or more acoustical transmitters and acoustical receivers may be in resonance (e.g. an acoustical transmitter generates acoustical waves that are in phase with a movement of the acoustical receiver).

Referring to FIGS. 1-3, 9 and 21, one or more of the intraluminal generator 100 and the power utilization device 107 may comprise one or more of an acoustical transmitter (e.g. an acoustic transducer and the like) and an acoustical receiver (e.g. a hydrophone) whereby energy may be conveyed via acoustical signals transceived between the intraluminal generator 100 and the power utilization device 107. The one or more acoustical transmitters and acoustical receivers may be in resonance (e.g. an acoustical transmitter generates acoustical waves that are in phase with a movement of the acoustical receiver) where the Q factor of the acoustical transmitter and acoustical receiver is at least 10,000. A transmitter/receiver system may be such as described in "Tunable high-Q surface-acoustic-wave resonator" by Dmitriev, et al., *Technical Physics*, Volume 52, Number 8, August 2007, pp. 1061-1067(7); U.S. Patent Application Publication No. 20060044078, "Capacitive Vertical Silicon Bulk Acoustic Resonator" to Ayazi, et al.; "Acoustic Wave Generation and Detection in Non-Piezoelectric High-Q Resonators", Lucklum, et al., *Ultrasonics Symposium*, 2006, October 2006, Pages: 1132-1135.

Referring to FIGS. 1-3, 10 and 21, energy generated by the intraluminal generator 100 in response to the movement and/or deformation of the pressure change receiving structure 103 may be transmitted to an at least partially intraluminal (e.g. inside of lumen 101A) power utilization device 107A via a coupling 106.

FIGS. 1-3, 10 and 21, energy generated by the intraluminal generator 100 in response to the movement and/or deformation of the pressure change receiving structure 103 may be transmitted to an at least partially extraluminal (e.g. external to a lumen 101A containing the intraluminal generator 100) power utilization device 107D via a coupling 108.

FIGS. 1-3, 10 and 21, energy generated by the intraluminal generator 100 in response to the movement and/or deformation of the pressure change receiving structure 103 may be transmitted to a power utilization device 107B via a coupling 108. The power utilization device 107B may be located within another lumen (e.g. a lumen 101B which does not contain the intraluminal generator 100). For example, an intraluminal generator 100 disposed within a respiratory lumen 101A may provide energy to a power utilization device 107B disposed within a vascular lumen 101B.

FIGS. 1-3, 11 and 21, energy generated by the intraluminal generator 100 in response to the movement and/or deformation of the pressure change receiving structure 103 may be transmitted to a power utilization device 107A in a distal position with respect to the intraluminal generator 100 via a coupling 108. An intraluminal generator 100 disposed within an aorta may provide energy to a power utilization device 107A disposed within a distal vein.

FIGS. 1-3, 11 and 21, energy generated by the intraluminal generator 100 in response to the movement and/or deformation of the pressure change receiving structure 103 may be transmitted to a power utilization device 107C in an ex vivo position (e.g. outside of a body defined by an epidermal layer 90) such as an ex vivo blood glucose monitor.

FIGS. 1-3, 12 and 21, energy generated by the intraluminal generator 100 in response to the movement and/or deformation of the pressure change receiving structure 103 may be transmitted to a power utilization device 107 including an insulin pump (e.g. U.S. Pat. No. 5,062,841 "Implantable, self-regulating mechanochemical insulin pump" to Siegel).

FIGS. 1-3, 12 and 21, energy generated by the intraluminal generator 100 in response to the movement and/or deformation of the pressure change receiving structure 103 may be transmitted to a power utilization device 107 including an neural stimulation electrode (e.g. U.S. Pat. No. 7,403,821, "Method and implantable systems for neural sensing and nerve stimulation" to Haugland et al.)

FIGS. 1-3, 12 and 21, energy generated by the intraluminal generator 100 in response to the movement and/or deformation of the pressure change receiving structure 103 may be transmitted to a power utilization device 107 including a pharmaceutical dispenser (e.g. U.S. Pat. No. 5,366,454, "Implantable medication dispensing device" to Currie, et al.)

FIGS. 1-3, 13 and 21, energy generated by the intraluminal generator 100 in response to the movement and/or deformation of the pressure change receiving structure 103 may be transmitted to a power utilization device 107 including a chemical sensor (e.g. U.S. Pat. No. 7,223,237, "Implantable biosensor and methods for monitoring cardiac health" to Shelchuk).

FIGS. 1-3, 13 and 21, energy generated by the intraluminal generator 100 in response to the movement and/or deformation of the pressure change receiving structure 103 may be transmitted to a power utilization device 107 including a pH sensor (e.g. U.S. Pat. No. 6,802,811, "Sensing, interrogating, storing, telemetering and responding medical implants" to Slepian).

FIGS. 1-3, 13 and 21, energy generated by the intraluminal generator 100 in response to the movement and/or deformation of the pressure change receiving structure 103 may be transmitted to a power utilization device 107 including an blood sugar monitor (e.g. U.S. Pat. No. 4,538,616, "Blood sugar level sensing and monitoring transducer" to Rogoff.)

FIGS. 1-3, 14 and 21, energy generated by the intraluminal generator 100 in response to the movement and/or deformation of the pressure change receiving structure 103 may be transmitted to a power utilization device 107 including an electromagnetic sensor (e.g. U.S. Pat. No. 7,425,200, "Implantable sensor with wireless communication" to Brockway, et al.)

FIGS. 1-3, 14 and 21, energy generated by the intraluminal generator 100 in response to the movement and/or deformation of the pressure change receiving structure 103 may be transmitted to a power utilization device 107 including an optical source (e.g. U.S. Pat. No. 7,465,313, "Red light implant for treating degenerative disc disease" to DiMauro, et al.)

FIGS. 1-3, 14 and 21, energy generated by the intraluminal generator 100 in response to the movement and/or deformation of the pressure change receiving structure 103 may be transmitted to a power utilization device 107 including an optical sensor (e.g. European Patent No. EP1764034, "Implantable self-calibrating optical sensors" to Poore).

FIGS. 1-3, 15 and 21, energy generated by the intraluminal generator 100 in response to the movement and/or deformation of the pressure change receiving structure 103 may be transmitted to a power utilization device 107 including an ultrasonic source (e.g. U.S. Patent Application Publication No. 2006/0287598, "System of implantable ultrasonic emitters for preventing restenosis following a stent procedure" to Lasater, et al.)

FIGS. 1-3, 15 and 21, energy generated by the intraluminal generator 100 in response to the movement and/or deformation of the pressure change receiving structure 103 may be transmitted to a power utilization device 107 including an ultrasonic sensor (e.g. U.S. Pat. No. 5,967,986, "Endoluminal implant with fluid flow sensing capability" to Cimochowski, et al.)

FIGS. 1-3, 16 and 21, energy generated by the intraluminal generator 100 in response to the movement and/or deformation of the pressure change receiving structure 103 may be transmitted to a power utilization device 107 including a processor (e.g. U.S. Pat. No. 5,022,395, "Implantable cardiac device with dual clock control of microprocessor" to Russie).

FIGS. 1-3, 16 and 21, energy generated by the intraluminal generator 100 in response to the movement and/or deformation of the pressure change receiving structure 103 may be transmitted to a power utilization device 107 including a memory storage device (e.g. U.S. Pat. No. 6,635,048, "Implantable medical pump with multi-layer back-up memory" to Ullestad).

FIGS. 1-3, 16 and 21, energy generated by the intraluminal generator 100 in response to the movement and/or deformation of the pressure change receiving structure 103 may be transmitted to a power utilization device 107 including a communication device (e.g. U.S. Pat. No. 7,425,200, "Implantable sensor with wireless communication" to Brockway, et al.)

FIGS. 1-3, 17 and 21, energy generated by the intraluminal generator 100 in response to the movement and/or deformation of the pressure change receiving structure 103 may be transmitted to a power utilization device 107 including an pressure sensor (e.g. U.S. Patent Application Publication No. 2006/0247724, "Implantable optical pressure sensor for sensing urinary sphincter pressure" to Gerber, et al.)

FIGS. 1-3, 17 and 21, energy generated by the intraluminal generator 100 in response to the movement and/or deformation of the pressure change receiving structure 103 may be transmitted to a power utilization device 107 including a flow sensor (e.g. U.S. Pat. No. 5,522,394, "Implantable measuring probe for measuring the flow velocity of blood in humans and animals" to Zurbrugg).

FIGS. 1-3, 17 and 21, energy generated by the intraluminal generator 100 in response to the movement and/or deformation of the pressure change receiving structure 103 may be transmitted to a power utilization device 107 including a flow modulation device (e.g. U.S. Pat. No. 7,367,968, "Implantable pump with adjustable flow rate" to Rosenberg, et al.)

FIGS. 1-3, 18 and 21, energy generated by the intraluminal generator 100 in response to the movement and/or deformation of the pressure change receiving structure 103 may be stored in an energy storage apparatus 105. The energy storage apparatus 105 may include, but is not limited to, a capacitive energy storage apparatus, a mechanical energy storage apparatus, a pressure energy storage apparatus, a chemical energy storage apparatus, and the like.

FIGS. 1-3, 18 and 21, energy generated by the intraluminal generator 100 in response to the movement and/or deformation of the pressure change receiving structure 103 may be stored in an energy storage apparatus 105. The energy that has been stored in the energy storage apparatus 105 may then be transmitted to a power utilization device 107.

FIGS. 1-3, 19 and 21, energy generated by the intraluminal generator 100 in response to the movement and/or deformation of the pressure change receiving structure 103 may be further configured (e.g. rectifying electrical energy, inverting electrical energy, converting energy from a first form (e.g. mechanical energy) to a second form (e.g. electrical energy), and the like) by a power converter 109 for use by a power utilization device 107 (e.g. a sensor, a pump, an electrode, a memory, a communications device, a energy storage apparatus, and the like).

FIGS. 1-3, 19 and 21, energy generated by the intraluminal generator 100 in response to the movement and/or deformation of the pressure change receiving structure 103 may be further configured by an electrical power converter 109 (e.g. "Implantable RF Power Converter for Small Animal In Vivo Biological Monitoring" by Chaimanonart, et al.; Proceedings of the 2005 IEEE Engineering in Medicine and Biology 27th Annual Conference; September 1-4, 2005).

FIGS. 1-3, 19 and 21, energy generated by the intraluminal generator 100 in response to the movement and/or deformation of the pressure change receiving structure 103 may be further configured by a switched-mode power converter 109 (e.g. U.S. Pat. No. 6,426,628; "Power management system for an implantable device" to Palm et al.)

FIGS. 1-3, 19 and 21, energy generated by the intraluminal generator 100 in response to the movement and/or deformation of the pressure change receiving structure 103 may be further configured by an AC-to-DC power converter 109 (e.g. U.S. Pat. No. 7,167,756; "Battery recharge management for an implantable medical device" to Torgerson, et al).

FIGS. 1-3, 20 and 21, energy generated by the intraluminal generator 100 in response to the movement and/or deformation of the pressure change receiving structure 103 may be further configured by a DC-to-AC power converter 109 (e.g. U.S. Pat. No. 6,937,894; "Method of recharging battery for an implantable medical device" to Isaac, et al).

FIGS. 1-3, 20 and 21, energy generated by the intraluminal generator 100 in response to the movement and/or deformation of the pressure change receiving structure 103 may be further configured by a DC-to-DC power converter 109 (e.g. U.S. Pat. No. 7,489,966; "Independent therapy programs in an implantable medical device" to Leinders, et al).

FIGS. 1-3, 20 and 21, energy generated by the intraluminal generator 100 in response to the movement and/or deformation of the pressure change receiving structure 103 may be further configured by an AC-to-AC power converter 109 (e.g. U.S. Pat. No. 5,188,738; "Alternating current supplied electrically conductive method and system for treatment of blood and/or other body fluids and/or synthetic fluids with electric forces" by Kaali, et al).

FIGS. 1-3, 20 and 21, energy generated by the intraluminal generator 100 in response to the movement and/or deformation of the pressure change receiving structure 103 may be further configured by an frequency power converter 109 (e.g. U.S. Pat. No. 6,829,507; "Apparatus for determining the actual status of a piezoelectric sensor in a medical implant" by Lidman, et al).

The herein described subject matter may illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system comprising:
   an anatomical intraluminal piezoelectric generator, the anatomical intraluminal piezoelectric generator configured for disposal in a lumen of a body;
   a deformable intraluminal pressure change-receiving structure operably coupled to the anatomical intraluminal piezoelectric generator; and
   a power utilization device, at least a portion of the power utilization device is configured for disposal at least one of intraluminally or extraluminally,
   wherein the anatomical intraluminal piezoelectric generator generates electricity in response to deformation of the deformable intraluminal pressure change-receiving structure,
   wherein the power utilization device comprises a power utilization device operably coupled to the anatomical intraluminal piezoelectric generator, and
   wherein the power utilization device operably coupled to the anatomical intraluminal piezoelectric generator comprises a power utilization device operably coupled to the anatomical intraluminal piezoelectric generator via an acoustical coupling.

2. The system of claim 1, wherein the power utilization device comprises:
   an at least partially intraluminal power utilization device.

3. The system of claim 1, wherein the power utilization device operably coupled to the anatomical intraluminal piezoelectric generator comprises:
   an at least partially extraluminal power utilization device.

4. The system of claim 1, wherein the power utilization device comprises:
   a power utilization device disposed in a first lumen configured to receive energy from the anatomical intraluminal piezoelectric generator disposed in a second lumen.

5. The system of claim 1, wherein the power utilization device comprises:
   a power utilization device in a distal configuration with respect to the anatomical intraluminal piezoelectric generator.

6. The system of claim 1, wherein the power utilization device comprises:
   an ex vivo power utilization device.

7. The system of claim 1, wherein the power utilization device comprises:
   an insulin pump.

8. The system of claim 1, wherein the power utilization device comprises:
a neural stimulation electrode.
9. The system of claim 1, wherein the power utilization device comprises:
a pharmaceutical dispenser.
10. The system of claim 1, wherein the power utilization device comprises:
a chemical sensor.
11. The system of claim 1, wherein the power utilization device further comprises:
a pH sensor.
12. The system of claim 1, wherein the power utilization device comprises:
a blood sugar monitor.
13. The system of claim 1, wherein the power utilization device comprises:
an electromagnetic sensor.
14. The system of claim 1, wherein the power utilization device comprises:
an optical source.
15. The system of claim 1, wherein the power utilization device comprises:
an optical sensor.
16. The system of claim 1, wherein the power utilization device comprises:
an ultrasonic source.
17. The system of claim 1, wherein power utilization device comprises:
an ultrasonic sensor.
18. The system of claim 1, wherein the power utilization device comprises:
a processor.
19. The system of claim 1, wherein the power utilization device comprises:
a memory storage device.
20. The system of claim 1, wherein the power utilization device comprises:
a communication device.
21. The system of claim 1, wherein the power utilization device further comprises:
a pressure sensor.
22. The system of claim 1, wherein the power utilization device further comprises:
a flow sensor.
23. The system of claim 1, wherein the power utilization device further comprises:
a flow modulation device.
24. The system of claim 1, further comprising:
an energy storage apparatus.
25. The system of claim 1, further comprising:
an energy configuration mechanism.
26. The system of claim 25, wherein the energy configuration mechanism comprises:
an electrical power convertor.
27. The system of claim 25, wherein the energy configuration mechanism comprises:
a switched mode power convertor.

* * * * *